United States Patent
Iu et al.

(10) Patent No.: US 11,113,738 B2
(45) Date of Patent: Sep. 7, 2021

(54) PRESENTING ENDORSEMENTS USING ANALYTICS AND INSIGHTS

(71) Applicant: Microsoft Technology Licensing, LLC, Redmond, WA (US)

(72) Inventors: Maria Iu, San Francisco, CA (US); Joey Bai, Sunnyvale, CA (US); Jie Zhang, Union City, CA (US); Richard Ramirez, Los Altos, CA (US); Victor Louis Kabdebon, Sunnyvale, CA (US); Hari Srinivasan, Palo Alto, CA (US); Yo-Tzu Yeh, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 148 days.

(21) Appl. No.: 15/711,884

(22) Filed: Sep. 21, 2017

(65) Prior Publication Data

US 2018/0089607 A1    Mar. 29, 2018

Related U.S. Application Data

(60) Provisional application No. 62/402,753, filed on Sep. 30, 2016, provisional application No. 62/402,955, (Continued)

(51) Int. Cl.
*G06Q 30/06* (2012.01)
*G06Q 50/00* (2012.01)
(Continued)

(52) U.S. Cl.
CPC ... *G06Q 30/0613* (2013.01); *G06F 16/24578* (2019.01); *G06F 16/9535* (2019.01);
(Continued)

(58) Field of Classification Search
CPC ....... G06Q 30/0613; G06Q 10/063112; G06Q 10/06395; G06Q 10/06398;
(Continued)

(56) References Cited

U.S. PATENT DOCUMENTS

| | | | | |
|---|---|---|---|---|
| 8,504,559 | B1 * | 8/2013 | Elman | G06Q 10/1053 |
| | | | | 707/722 |
| 8,977,687 | B2 * | 3/2015 | Chandar | G06Q 10/10 |
| | | | | 709/204 |

(Continued)

OTHER PUBLICATIONS

Viet Ha-Thuc *, Ganesh Venkataraman*, Mario Rodriguez*, Shakti Sinha*, Senthil Sundaram* and Lin Guo*, Personalized Expertise Search at LinkedIn, 2015 IEEE International Conference on Big Data (Big Data) (Year: 2015).*

(Continued)

*Primary Examiner* — Rutao Wu
*Assistant Examiner* — Abdallah A El-Hage Hassan
(74) *Attorney, Agent, or Firm* — Schwegman Lundberg & Woessner, P.A.

(57) ABSTRACT

Techniques for presenting a featured skill of a first member of a social network system are described. An example system presents the featured skill on a profile page of the first member. The system can receive a request to view the profile page from a device of a second member. Additionally, profile data of the first and second members can be accessed, the profile data including skills associated with the first member. An endorser value can be determined for the first member based on a reputation score, the endorser value being associated with the first member having a specific skill. Moreover, a quality score for each skill in the skills can be calculated using the endorser value and the profile data. Furthermore, the featured skill can be selected based on the quality score. Subsequently, a user interface can present the featured skill on the profile page of the first member.

20 Claims, 11 Drawing Sheets

Related U.S. Application Data filed on Sep. 30, 2016, provisional application No. 62/401,826, filed on Sep. 29, 2016.

(51) Int. Cl.
| | |
|---|---|
| *G06F 16/9535* | (2019.01) |
| *G06F 16/2457* | (2019.01) |
| *G06Q 10/06* | (2012.01) |
| *G06Q 10/10* | (2012.01) |
| *H04L 29/08* | (2006.01) |

(52) U.S. Cl.
CPC . *G06Q 10/06395* (2013.01); *G06Q 10/06398* (2013.01); *G06Q 10/063112* (2013.01); *G06Q 10/1053* (2013.01); *G06Q 50/01* (2013.01); *H04L 67/306* (2013.01)

(58) Field of Classification Search
CPC G06Q 10/1053; G06Q 50/01; G06F 16/9535; G06F 16/24578; H04L 67/306
USPC ......................................................... 705/7.42
See application file for complete search history.

(56) References Cited

U.S. PATENT DOCUMENTS

| | | | | |
|---|---|---|---|---|
| 9,178,933 | B1* | 11/2015 | Soland | H04L 67/18 |
| 9,661,039 | B2* | 5/2017 | Cheng | H04L 65/40 |
| 9,721,296 | B1* | 8/2017 | Chrapko | G06N 7/005 |
| 2006/0042483 | A1* | 3/2006 | Work | G06F 16/24578 |
| | | | | 101/91 |
| 2012/0197733 | A1* | 8/2012 | Skomoroch | G06F 16/355 |
| | | | | 705/14.66 |
| 2013/0254305 | A1* | 9/2013 | Cheng | G06Q 10/101 |
| | | | | 709/206 |
| 2013/0318630 | A1* | 11/2013 | Lam | H04L 9/3249 |
| | | | | 726/28 |
| 2014/0129464 | A1* | 5/2014 | Grayevsky | G06Q 10/1053 |
| | | | | 705/321 |
| 2014/0129631 | A1* | 5/2014 | Jayaram | G06Q 10/10 |
| | | | | 709/204 |
| 2014/0214946 | A1* | 7/2014 | van de Bruggen | H04L 51/32 |
| | | | | 709/204 |
| 2014/0244335 | A1* | 8/2014 | Baldwin | G06Q 10/06311 |
| | | | | 705/7.17 |
| 2015/0248739 | A1* | 9/2015 | Schulman | G09B 5/00 |
| | | | | 434/322 |
| 2016/0012395 | A1* | 1/2016 | Omar | G06Q 10/105 |
| | | | | 705/320 |
| 2016/0055597 | A1* | 2/2016 | Berson | G06Q 10/105 |
| | | | | 705/319 |
| 2017/0032325 | A1* | 2/2017 | Venkataraman | G06F 16/248 |
| 2017/0277693 | A1* | 9/2017 | Mehedy | G06F 16/532 |
| 2018/0012188 | A1* | 1/2018 | Kramer | G06Q 50/01 |

OTHER PUBLICATIONS

Hebert Perez-Roses, Francesc Sebe, Josep Maria Ribo, Endorsement Deduction and Ranking in Social Networks. Department of Computer Science and Industrial Engineering, Universitatde Lleida, Spain, 2015 (Year: 2015).*

"Final Office Action Issued in U.S. Appl. No. 15/373,810", dated Nov. 6, 2019, 45 Pages.

"Non Final Office Action issued in U.S. Appl. No. 15/373,810", dated Jul. 17, 2019, 34 Pages.

"Restriction Requirement Issued in U.S. Appl. No. 15/373,810", dated Mar. 14, 2019, 7 Pages.

"Non Final Office Action issued in U.S. Appl. No. 15/711,749", dated Jul. 30, 2019, 47 Pages.

"Final Office Action Issued in U.S. Appl. No. 15/711,749", dated Jan. 15, 2020, 56 Pages.

* cited by examiner

PRESENTING ENDORSEMENTS USING ANALYTICS AND INSIGHTS

PRIORITY CLAIM

This application claims priority under 35 U.S.C. 119(e) to U.S. Provisional Patent Application Ser. No. 62/402,955, filed Sep. 30, 2016, which is incorporated herein by reference in its entirety. Additionally, this application claims priority under 35 U.S.C. 119(e) to U.S. Provisional Patent Application Ser. No. 62/401,826, filed Sep. 29, 2016, U.S. Provisional Patent Application Ser. No. 62/402,753, filed Sep. 30, 2016, and U.S. patent application Ser. No. 15/373,810 filed Dec. 9, 2016, which are incorporated herein by reference in their entirety.

TECHNICAL FIELD

The subject matter disclosed herein generally relates to data processing associated with a skill presentation system having an endorsement database. The endorsement database can present a featured endorsement of a skill from a plurality of endorsements based on the viewer of the featured endorsement. Specifically, the present disclosure relates to techniques for calculating a quality score for the featured endorsement based on member data of the viewer and the recipient of the endorsement.

BACKGROUND

A social network system can maintain information on members, companies, organizations, employees, and employers. The social network system may maintain profile pages of members, which can include education information, employment information, and location information about a specific member. Additionally, the social network system can store information about a member's relationships (e.g., connections) with other members of the social network system. Furthermore, the social network system can store endorsements and recommendations of a member. For example, a first member of the social network can endorse a second member in a skill using an endorsement. The endorsement can be presented on the profile page of the second member.

BRIEF DESCRIPTION OF THE DRAWINGS

Some embodiments are illustrated by way of example and not limitation in the figures of the accompanying drawings.

DETAILED DESCRIPTION

Figure 1:
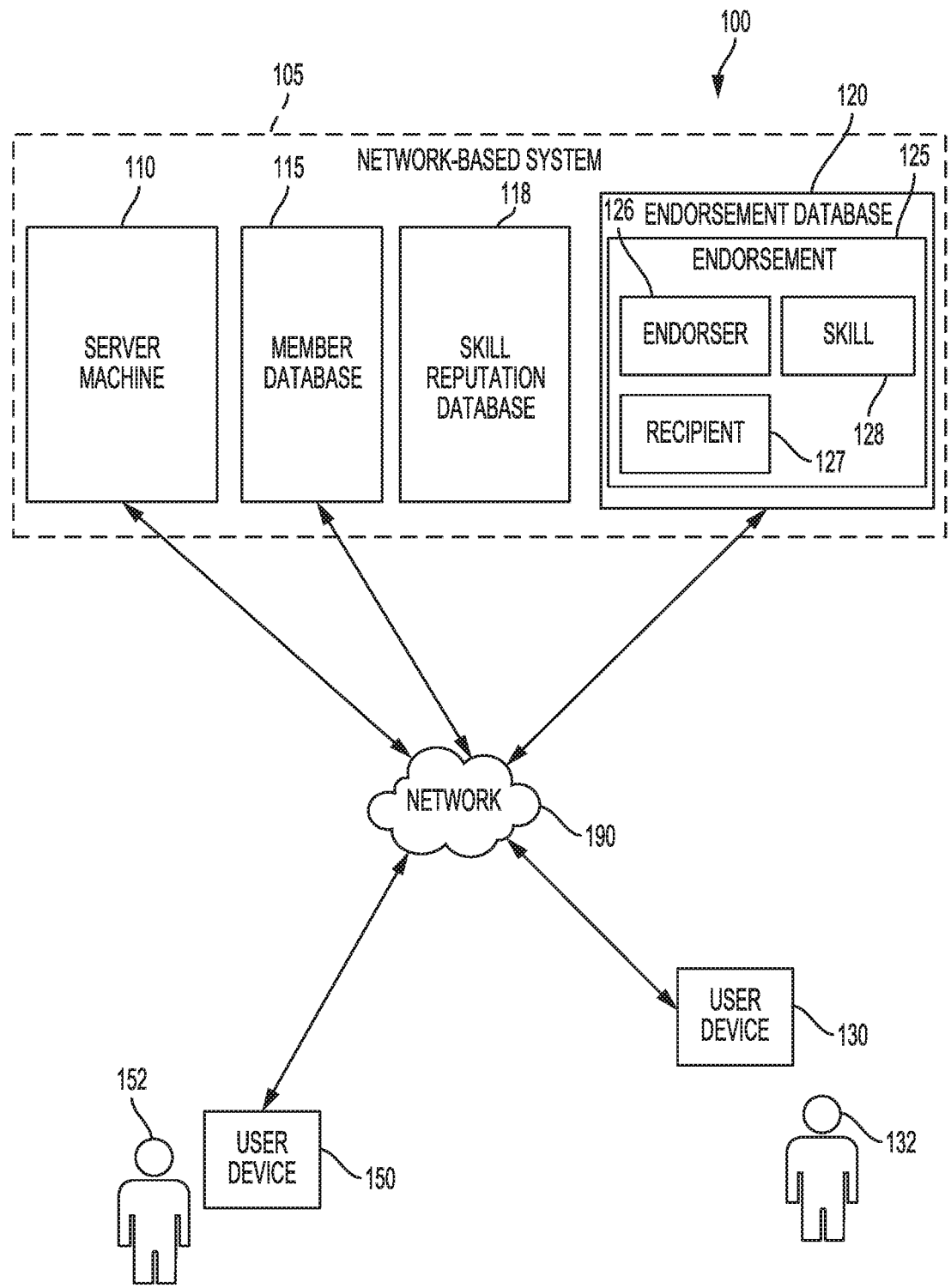
FIG. 1 is a network diagram illustrating a network environment suitable for a social network system, according to some example embodiments.

Example methods and systems are directed to techniques for a skill validation system having an endorsement database. More specifically, the present disclosure relates to methods, systems, and computer program products for presenting a featured skill on a profile page of a member. The selection of the featured skill is based on a quality score for an endorsement associated with the featured skill. Techniques for calculating the quality score for the endorsement are described herein.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In current implementations, a first member of a social network system can endorse (e.g., recommend) a specific skill of a second member of the social network system by sending an endorsement for the specific skill. The first member can be the "endorser" that sends the endorsement for the specific skill to the second member. The second member can be referred to as the "recipient" of the endorsement. Additionally, the endorsement can be presented on a profile page of the recipient. The endorsement can signify that the endorser recommends the recipient as an expert or as being proficient in the corresponding skill. For example, an endorsement in accounting demonstrates that the endorser recognizes the recipient's skill in accounting.

However, in current implementations, not all endorsements received by the recipient can be a representative of the recipient's ability in the specific skill. For example, an endorsement received from a first endorser that has the specific skill and knows the recipient can be more meaningful than an endorsement received from a second endorser that does not possess the skill and does not know the recipient.

According to some embodiments, the social network system can generate a featured skill to present on a profile page of a member. The featured skill section of the profile page may only include a few skills that the member has been endorsed for. The featured skill can be selected from all of the skills of the member based on the relevance of the featured skill to the viewer of the profile page. Additionally, the featured skill can be further based on the relevance to the job title and industry of the member. The relevance of a skill can be calculated using a quality score.

In some instances, the quality score of an endorsement can depend on an endorser value of the first member, a recipient value of the second member, and an overlap value between the first member and the second member. Additionally, the quality score can further depend on a reputation score of first member possessing the specific skill and a reputation score of the second member possessing the specific skill. In some instances, the reputation score may be stored in the reputation database.

The quality score can be correlated to the likelihood that the endorser knows the skill. Furthermore, the quality score can further depend on the connection strength between the endorser and the recipient. Continuing with the example above, when the endorser is skilled in accounting and also works with the recipient at the same accounting firm, then the quality score for the endorsement can be higher than a quality score of an endorsement from another endorser that does not possess the skill or know the recipient.

The social network system can generate an endorsement suggestion when the quality score is higher than a predetermined threshold (e.g., 80 out of 100). A score that is at or above the predetermined threshold is generally considered a high-quality score. Furthermore, an endorsement with a high-quality score can be classified as a high-quality endorsement. In some instances, the high-quality endorsements can be highlighted in the profile page of the recipient. For example, the endorsement is presented by having the specific skill listed as a featured skill on the profile page of the recipient when the quality score is above the predetermined threshold. Alternatively, when the quality score is below the predetermined threshold, the specific skill is not listed as the featured skill on the profile page of the recipient.

In some instances, a member of the social network system may want to search for a member having a specific skill. In current implementations, the search results for the member can be associated with the number of endorsements received for the skill. However, ranking simply based on the number of endorsements received can have many limitations. For example, a member profile page can include, without verification, an endorsement associated with a specific skill. In contrast, techniques are described herein for finding a member with a validated skill using the quality score of the endorsement. By finding the validated expert, a user can obtain accurate information about members of the social network, which can result in the user saving time and resources.

According to some embodiments, an indexing process can rank members using the quality score associated with the endorsements. For example, a higher ranking in the search results can be given to a member with endorsements that have been classified as high-quality endorsements. An endorsement is qualified as a high-quality endorsement when the quality score is above a predetermined threshold (e.g., 80 out of 100). Additionally, the member profile page can include featured skills that only include high-quality endorsements. In some instances, the profile page of a member includes a section that lists the featured skills of the member. For example, the featured skills can include endorsements from endorsers that have either worked with the member or know the member. The high-quality endorsement listed on the featured skills section can include educational information or employment information about the endorser.

According to some embodiments, the social network system includes an endorsement database that uses machine learning models to determine a quality score for each endorsement. The endorsement database can include a database architecture tailored for endorsements. As a result, the endorsement database allows for a faster data retrieval rate, for the endorsements to be sent faster by an endorser, and for faster data processing related to the endorsements. For example, when a first member views a profile page of a second member, suggested endorsements of the second member can be presented faster for the first member to endorse. Furthermore, the endorsement database can include a quality endorsement metric that can deliver more insights about the endorsement received by analyzing the connections and skills of the endorser and the recipient.

Additionally, techniques described herein allow for selecting a featured skill from the plurality of skills associated with a member based on a quality score associated with the endorsement. Techniques described herein allow for faster processing speed for processing the endorsement data to determine the quality score of the endorsement for the skill in real-time. Additionally, techniques described herein allow for a faster retrieval of the endorsement data.

FIG. 1 is a network diagram illustrating a network environment 100 suitable for a social network system, according to some example embodiments. The network environment 100 includes a server machine 110, a member database 115, a skill reputation database 118, an endorsement database 120, a first device 130 for a first user 132, and a second device 150 for a second user 152, all communicatively coupled to each other via a network 190. The server machine 110, the member database 115, the skill reputation database 118, and the endorsement database 120 may form all or part of a network-based system 105 (e.g., a cloud-based server system configured to provide one or more services to the devices 130 and 150). The server machine 110, the first device 130, and the second device 150 may each be implemented in a computer system, in whole or in part, as described below with respect to FIG. 11.

The member database 115 can store, but is not limited to storing, member data, company data, education data, social graph data, and member activity data for the social network system service. In some instances, the member database 115 can include a plurality of databases (e.g., a first database to store profile data, a second database to store social data, a third database to store member activity data). The server machine 110 can access the information in the member database 115 using the network 190.

The skill reputation database 118 can store a plurality of reputation scores for the members. Each reputation score in the plurality of reputation scores can be associated with a member having a skill. The reputation score for a skill of a member can be calculated using member data (e.g., job title, company name, education information, years of experience) of the member. For example, the reputation score for the accounting skill of a member who is an accountant with 15 years of experience can be 95 out of 100, which can identify that the member is proficient and an expert in accounting. The server machine 110 can access the information in the skill reputation database 118 using the network 190.

The endorsement database 120 can store a plurality of endorsements. Endorsement 125 is an example of an endorsement in the plurality of endorsements that is stored in the endorsement database 120. The endorsement 125 includes an endorser 126, a recipient 127, and a skill 128. For example, the endorser 126 endorses the recipient 127 in a specific skill 128. Both the endorser 126 and the recipient 127 can be members of the social network system. The server machine 110 can access the information in the endorsement database 120 using the network 190.

Also shown in FIG. 1 are the users 132 and 152. One or both of the users 132 and 152 may be a human user (e.g., member of the social network system), a machine user (e.g., a computer configured by a software program to interact with the device 130 or 150), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

In some instances, the user 132 can be the endorser 126 that endorses the user 152, who is the recipient 127 of the endorsement 125. In another example, the user 132 can be the member searching for a member proficient in a specific skill, and the user 152 can be validated in the specific skill. For example, the server machine 110 can transmit a message to the user 152 on behalf of the user 132 using the network 190.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Any of the machines, databases, or devices described herein may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices described herein may be combined into a single machine, database, or device, and the functions described herein for any single machine, database, or device may be subdivided among multiple machines, databases, or devices.

Figure 2:
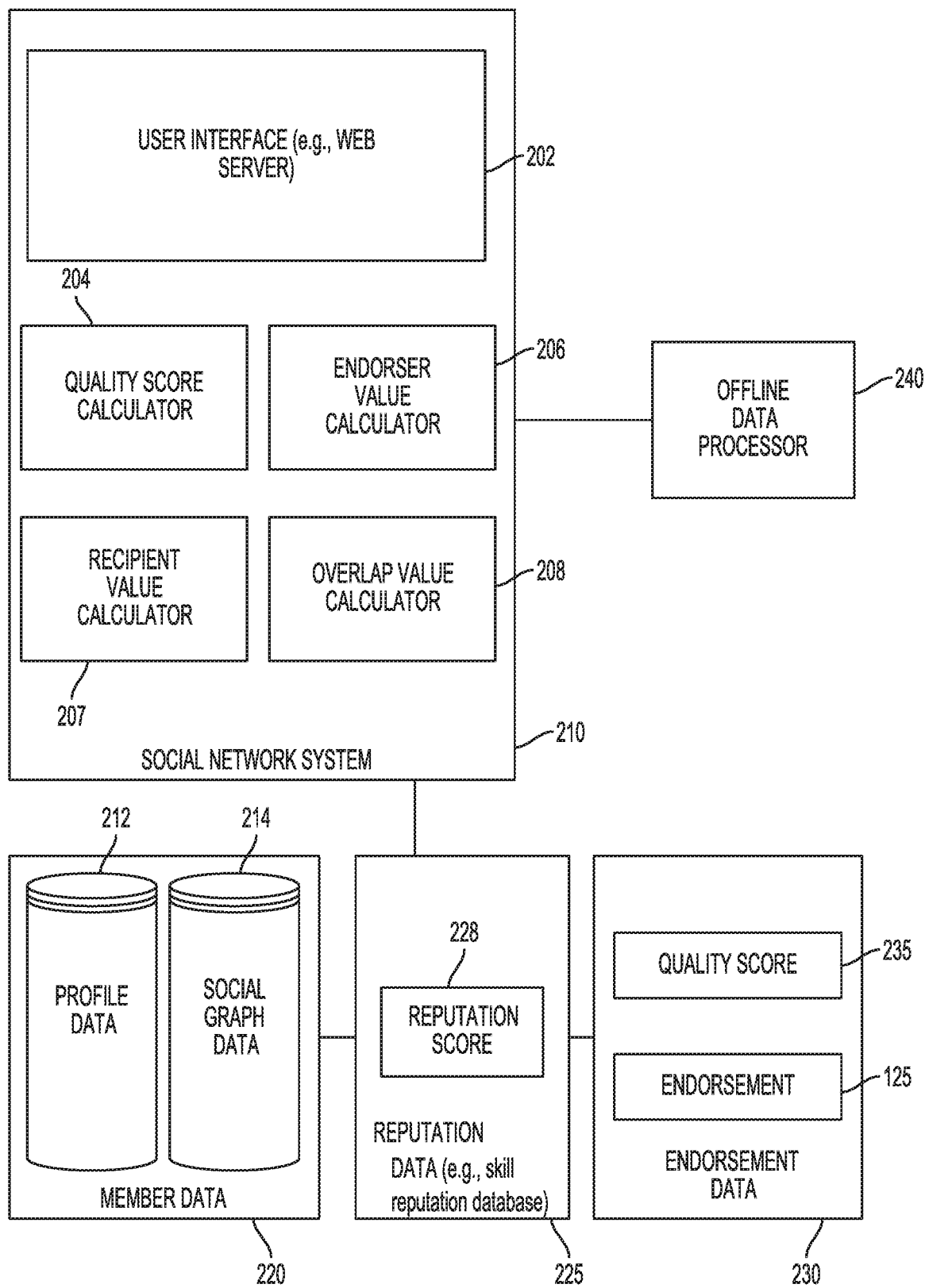
FIG. 2 is a block diagram illustrating various components of a social network system, according to some example embodiments.

FIG. 2 is a block diagram illustrating components of social network system 210, according to some example embodiments. The social network system 210 is an example of a network-based system 105 of FIG. 1. The social network system 210 can include a user interface 202, a quality score calculator 204, an endorser value calculator 206, a recipient value calculator 207, and an overlap value calculator 208. One or more of the components 202-208 may be configured to communicate with each other (e.g., via a bus, shared memory, or a switch). The user interface 202 can provide information or cause an interface to be rendered on a client device of the member. For example, the user interface 202 can present, on a profile page of the recipient, a validation for a specific skill when the quality score of the endorsement is above a predetermined threshold.

Additionally, the social network system 210 can communicate with the member database 115 of FIG. 1, the skill reputation database 118, and the endorsement database 120 of FIG. 1. The member database 115 can store member data 220. The skill reputation database 118 can store reputation data 225 of each member in a specific skill. As shown in the example of FIG. 2, the reputation data 225 may be stored in a skill reputation database). The endorsement database 120 can store endorsement data 230.

The member data 220 can include profile data 212, which includes information from a profile page of a member. Moreover, the member data 220 can include social graph data 214 and member activity data. As later described in FIG. 3, the endorser value calculator 206 can determine an endorser value for the endorser 126 using the member data 220 of the endorser 126. Additionally, the recipient value calculator 207 can determine a recipient value for the recipient 127 using the member data 220 of the recipient 127. Moreover, the overlap value calculator 208 can determine an overlap value using the member data 220 of both the endorser 126 and the recipient 127. Furthermore, the quality score calculator 204 can determine a quality score for the endorsement using the endorser value, the recipient value, and the overlap value. In some instances, some of the processing of the data for determining the endorser value, the recipient value, and overlap value can be performed by an offline data processor 240 on a periodic basis (e.g., nightly) in order to return faster calculation results.

The profile data 212 can be used to determine the endorser value and the recipient value in a specific skill. For example, the endorser value of the endorser in a specific skill depends the endorser having profile data (e.g., job title, degree, industry) that is related to the specific skill. Similarly, the recipient value of the recipient in a specific skill depends on the recipient having profile data (e.g., job title, degree, industry) that is related to the specific skill. Profile data 212 related to the specific skill includes having the specific skill listed on the profile page, a recommendation of the specific skill, a degree associated with the specific skill, a job title associated with the specific skill, and other educational and/or employment data associated with the specific skill. Additionally, the social network system 210 maintains an association between various skills, and skills associated with the specific skill are be determined to be the same or related.

For instance, with many social network system services, when a user registers to become a member, the member is prompted to provide a variety of personal and employment information that may be displayed in a member's profile page. As used herein, personal and/or employment information is referred to as profile data 212. The profile data 212 can be used to determine the endorser value and the recipient value in a specific skill. The profile data 212 that is commonly requested and displayed as part of a member's profile includes the member's age, birthdate, gender, interests, contact information, home location (e.g., city and state), educational background (e.g., schools, majors, matriculation, graduation dates, etc.), employment history, office location, skills, professional organizations, and other such personal and/or employment information. In some embodiments, the profile data 212 may include the various skills that each member has indicated he or she possesses. Additionally, the profile data 212 may include skills of a member that have been endorsed by another member. Furthermore, the profile data 212 may include recommendations of a member from another member (e.g., co-worker).

With certain social network system services, such as professional network services, the profile data 212 can include information commonly included in a professional resume or curriculum vitae, such as information about a person's education, the company at which a person is employed, the location of the employer, an industry in which a person is employed, a job title or function, an employment history, skills possessed by a person, professional organizations of which a person is a member, and so on.

Additionally, social network system services provide their users with a mechanism for defining their relationships with other people. This digital representation of real-world relationships is frequently referred to as a social graph, which may be stored in the social graph data 214.

The social graph data 214 can be associated with an entity's presence within the social network system service. For example, consistent with some embodiments, a social graph is implemented with a specialized graph data structure in which various entities (e.g., people, companies, schools, government institutions, non-profits, and other organizations) are represented as nodes connected by edges, where the edges have different types representing the various associations and/or relationships between the different entities. The social graph data 214 of a member can include first-degree connections, second-degree connections, and so on. In one embodiment, a first member is a first-degree connection of a second member when the first and second members are connected in the social network system 210. Similarly, a first member is a second-degree connection to a second member when the first and second members are not connected to each other, but both are connected to a third member. As can be inferred from the foregoing, an nth-degree connection is a connection where a first node and a second node are separated by N−1 nodes.

In some instances, the endorser value calculator 206 can determine an endorser value for the endorser 126 using profile data 212 and social graph data 214 of the endorser 126. For example, the endorser value calculator 206 can access the profile data 212 to obtain a number of endorsements given or received by the endorser 126, a number of skills listed on the profile page of the endorser 126, a consumer marketing segment, a seniority, years in career. Additionally, the endorser value calculator 206 can access the social graph data 214 to determine a number of connections and a number of endorsements per connection. For example, the endorser value is determined using Equation 1.

$$\text{Endorser Value} = C_0(\text{Number of Endorsement Given by Endorser}) + C_1(\text{Number of Endorsement Received}) + C_2(\text{Number of Skills}) + C_3(\text{Years in Career}) + C_4(\text{Number of Connections}) + C_5(\text{Number of Endorsements Per Connection}),$$ (Equation 1)

where $C_0 \ldots C_5$ are coefficients with a range from 0 to 1.

In some instances, the recipient value calculator 207 can determine a recipient value for the recipient 127 using profile data 212 and social graph data 214 of the recipient 127. For example, the recipient value calculator 207 can access the profile data 212 to obtain a number of endorsements given or received by the recipient 127, a number of skills listed on the profile page of the recipient 127, a consumer marketing segment, a seniority, years in career. Additionally, the endorser value calculator 206 can access the social graph data 214 to determine a number of connections. For example, the recipient value is determined using Equation 2.

$$\text{Recipient Value} = C_0(\text{Number of Endorsement Given by Recipient}) + C_1(\text{Number of Endorsement Received}) + C_2(\text{Number of Skills}) + C_3(\text{Years in Career}) + C_4(\text{Number of Connections}),$$ (Equation 2)

where $C_0 \ldots C_5$ are coefficients with a range from 0 to 1.

In some instances, the overlap value calculator 208 can determine an overlap value between the endorser and the recipient using the social graph data 214 (e.g., first-degree connections) of the endorser 126 and the recipient 127. For example, the overlap value calculator 208 can access the social graph data 214 to determine a connection density between the endorser 126 and the recipient 127, as later described in FIG. 3. The overlap value for the endorser 126 and the recipient 127 can be determined based on the connection density value. For example, the overlap value is determined using Equation 3. The values for the common employer, common industry, common job title, common school, common degree, and common location can be a binary number, where 1 indicates that the first and second members have a profile attribute (e.g., employer, industry, job title, school, degree) in common.

$$\text{Overlap Value} = C_0(\text{Common Employer}) + C_1(\text{Common Industry}) + C_2(\text{Common Job Title}) + C_3(\text{Common School}) + C_4(\text{Common Degree}) + C_5(\text{Common Location}),$$ (Equation 3)

where $C_0 \ldots C_5$ are coefficients with a range from 0 to 1.

The social network system 210 may provide a broad range of other applications and services that allow members the opportunity to share and receive information, often customized to the interests of the members. In some embodiments, members may be able to self-organize into groups, or interest groups, organized around subject matter or a topic of interest. In some embodiments, the social network system 210 may host various job listings providing details of job openings with various organizations.

In some instances, the member data 220 may include member activity data. The member activity data include members' interaction with the various applications, services, and content made available via the social network system 210, and the members' behavior (e.g., content viewed, links selected, etc.) may be used to determine the member's proficiency in a specific skill. For example, the endorser 126 viewing content associated with accounting may increase the endorser value for the accounting endorsement.

The reputation data 225 includes reputation scores of members in a specific skill. For example, a member can have a first reputation score for a first skill and a second reputation score for a second skill. The first reputation score and the second reputation score are examples of a reputation score

228. The reputation score 228 can be obtained from the skill reputation database 118 in FIG. 1. As previously mentioned, the skill reputation database 118 can be maintained by the server machine 110. For example, the reputation score for a first skill is determined using Equation 4:

Reputation Score=$C_0$(Member has skill on profile)+
$C_1$(Member has been endorsed for skill)+$C_2$
(Member has been recommended for skill)+$C_3$
(Member has related skill on profile), (Equation 4)

where $C_0 \ldots C_3$ are coefficients with a range from 0 to 1.

The endorsement data 230 includes the various skills for which each member has been endorsed. For example, as described in FIG. 1, using an endorsement 125, the endorser 126 can endorse the recipient 127 in a specific skill 128. Additionally, the endorsement data 230 can include the various skills that each member has indicated he or she possesses. In some instances, the expert determination process can rank subject matter experts in a specific skill using a quality score 235 associated with the endorsement 125. As later described in FIG. 3, the quality score calculator 204 can calculate the quality score 235 for the endorsement 125 using the endorser value, the recipient value, and the overlap value.

Furthermore, the social network system 210 can be configured to process data offline or periodically using an offline data processor 240. In some instances, some or all of the calculations performed by the quality score calculator 204, endorser value calculator 206, recipient value calculator 207, and overlap value calculator 208 can be performed by the offline data processor 240. For example, the offline data processor 240 can include one or more large-scale processing servers, such as Apache™ Hadoop® servers that access the member data 220, reputation data 225, and endorsement data 230 periodically (e.g., on a nightly basis) in order to calculate the quality score, the endorser value, the recipient value, and the connection density.

Processing the member data 220, such as calculating the quality score for an endorsement, may be computationally intensive. Therefore, some of the calculating and selecting can be done offline, such as one or more parameters associated with the quality score. For example, the member data 220 may be processed offline by the endorser value calculator 206 to determine the endorser value of the endorser 126. Additionally, the member data 220 may be processed offline by the recipient value calculator 207 to determine the recipient value of the recipient 127 for a specific skill. By having the one or more parameters calculated offline, less real-time processing time may be needed by the quality score calculator 204, endorser value calculator 206, recipient value calculator 207, and overlap value calculator 208 in order to calculate the quality score for each endorsement. As a result, these parameters can be inputted in the quality score calculator 204, endorser value calculator 206, recipient value calculator 207, and overlap value calculator 208 in real-time in order to almost instantaneously present the validation of the endorsement on the profile page of the recipient 127.

Figure 3:
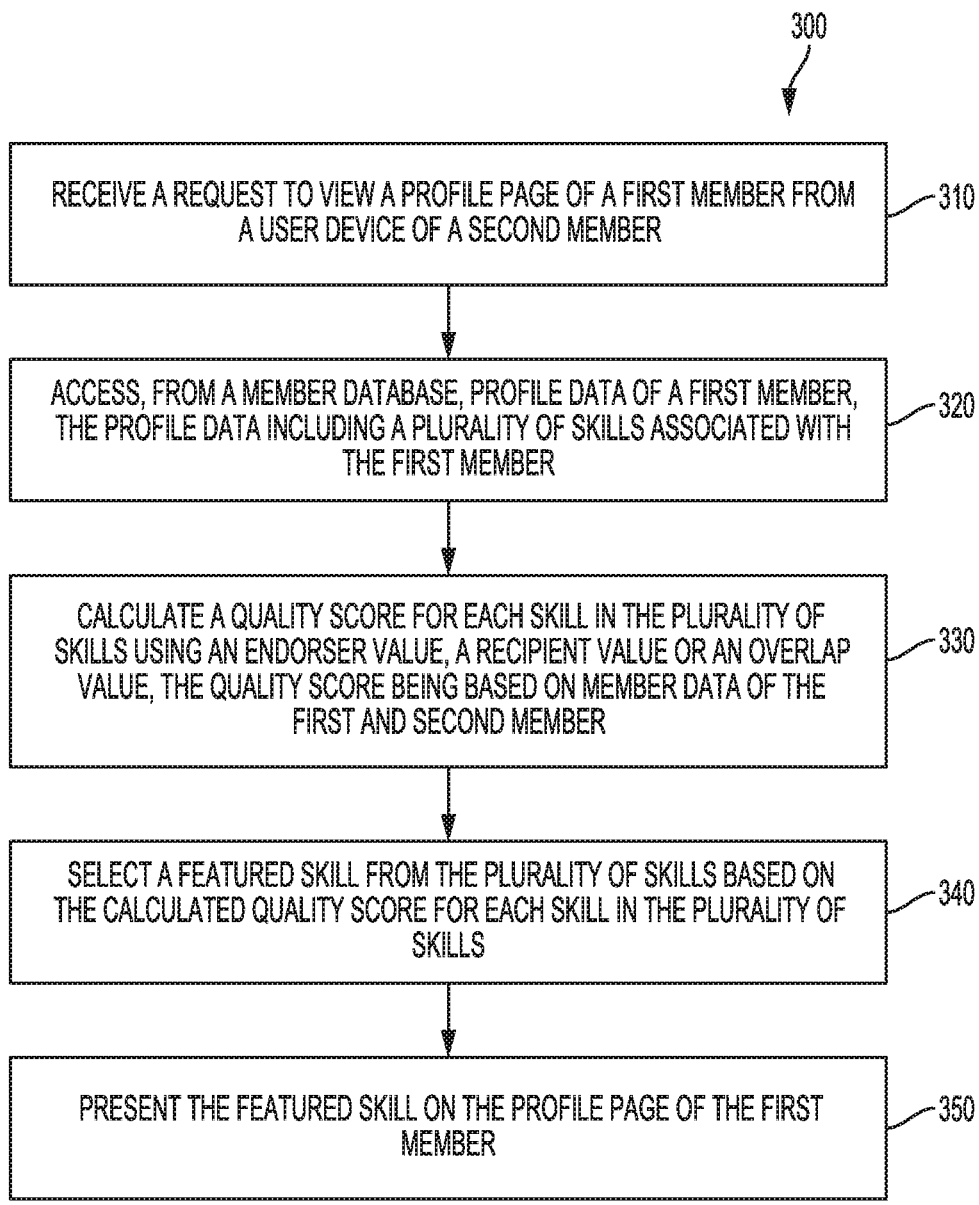
FIG. 3 is a flowchart illustrating a method for selecting and presenting a featured skill on a profile page, according to some embodiments.

As will be further described with respect to FIG. 3, the quality score calculator 204, in conjunction with the endorser value calculator 206, the recipient value calculator 207, and the overlap value calculator 208, can calculate a quality score 235 for an endorsement 125. Additionally, the user interface 202 can present a validation of a skill using the quality score 235.

FIG. 3 is a flowchart illustrating operations of the social network system 210 in performing a method 300 for selecting and presenting a featured skill on a profile page, according to some example embodiments. Operations in the method 300 may be performed by the social network system 210, using the quality score calculator 204, the endorser value calculator 206, the recipient value calculator 207, and the overlap value calculator 208 described above with respect to FIG. 2.

As previously mentioned, the social network system 210 can include the member database 115 storing profile data 212 of members in the social network. Additionally, the member database 115 can include social graph data 214. The profile data 212 includes employment information (e.g., job title, industry, years of experience) of the members and educational information (e.g., degree, major, school name, graduation year) of the members. Furthermore, the member database 115 includes member data of a plurality of members in a social network, the member data including a plurality of skills associated with a member in the plurality of members Additionally, the social network system 210 can access the skill reputation database 118 storing a plurality of reputation scores for the members. Each reputation score 228 in the plurality of reputation scores can be associated with a member having a skill. The reputation score 228 can be determined by the social network system 210 using the offline data processor 240 using the member data 220 of the member.

At operation 310, the social network system 210 can receive a request to view the profile page of a first member. The request can be received from a user device of a second member. The request can be received using network 190 in FIG. 1. The first member can be user 132 using user device 130. The second member can be user 152 using user device 150.

At operation 320, the social network system 210 can access, from the member database 115, profile data 212 of the first member. The profile data 212 of the first member includes a plurality of skills associated with the first member. For example, the plurality of skills can include all of the skills that the first member has received an endorsement for. The server machine 110 can access the member database 115 using network 190.

At operation 330, the social network system 210 can calculate a quality score for each skill in the plurality of skills. In some embodiments, the quality score may be based on endorsements for skills in the plurality of skills (i.e., skills where there has been an endorsement received or given). The quality score can depend on an endorser value for the first member, a recipient value for the second member, and an overlap value between the first and second members. The quality score can be based on the member data 220 of the first member and the member data 220 of the second member. The member data 220 (e.g., profile data 212) can be accessed from the member database 115.

For example, the quality score calculator 204 calculates the quality score 235 associated with the endorsement 125 based on the endorser value, the recipient value, the overlap value, or the reputation value. A processor in the server machine 110 can calculate the quality score in real-time. In some instances, part of the calculation of the quality score can be performed offline using the offline data processor 240.

The social network system 210 can calculate a quality score for the specific skill based on the profile data 212 of the first member and the second member. In certain embodiments, the quality score for the specific skill may be based on endorsements for that specific skill (i.e., one or more endorsements received or given for that skill). For example, the quality score calculator 204 calculates a quality score for an endorsement based on the endorser value and the overlap value. In some instances, the quality score 235 can be calculated by adding the endorser value and the overlap value. Alternatively, the quality score 235 can be calculated by averaging the endorser value and the overlap value. Additionally, the calculated quality score can be stored in the endorsement data 230 as the quality score 235 that is associated with the endorsement 125. For example, the quality score 235 can range from 0-100. A higher score can be associated with a member that is more proficient in the skill than another member having a lower score. A processor in the server machine 110 can calculate the quality score 235 in real-time. In some instances, part of the calculation of the quality score 235 can be performed offline using the offline data processor 240.

For example, the quality score 235 can be calculated using Equation 5:

$$\text{Quality Score} = C_0(\text{Endorser Value}) + C_1(\text{Recipient Value}) + C_2(\text{Overlap Value}) + C_3(\text{Reputation Value}),\quad\text{(Equation 5)}$$

where $C_0 \ldots C_3$ are coefficients with a range from 0 to 1.

In some instances, the coefficients in Equation 1-5 can be determined using a logistic regression model. For example, the logistic regression model can find the coefficients $C_0$-$C_3$ that maximizes the likelihood that the classification of the endorsement being a high-quality endorsement under the logistic regression model. As known in the art, there several efficient optimization algorithms for doing this task. In some other instances, the coefficients in Equation 1-5 can be determined using other models such as a linear regression model, a decision tree model, a support vector machine model, and a Naïve Bayesian model, or other machine learning algorithms.

At operation 340, the social network system 210 can select a featured skill from the plurality of skills based on the calculations at operation 330. The featured skill is selected based on the calculated quality score for each skill in the plurality of skills. In some embodiments, the quality score may be based on endorsements for skills in the plurality of skills (i.e., skills for which an endorsement has been received or given). For example, the skill with the highest quality score can be selected as the featured skill. In some instances, more than one (e.g., three) featured skill can be selected. In the case where a specific quantity of featured skills are selected, then the specific quantity of skills with the top quality scores are selected. For example, when three featured skills are presented on the profile page of the first member, then the skills having the three highest-quantity scores are selected. In certain embodiments, a predetermined threshold for the highest-quantity quality scores may be used to select features skills.

In some instances, the predetermined threshold (e.g., 50) for a highest-quantity quality score can be preset by an administrator of the social network system 210. Additionally, the predetermined threshold can be adjusted in direct correlation with the number of validated skills associated with a member. For example, the predetermined threshold is decreased when the profile page of the member does not have any skills having a validation.

At operation 350, the user interface 202 can present the featured skill on the profile page of the first member. In some instances, the profile page of the first member may only include the featured skill(s), and not include all of the remaining skills that the first member has been endorsed for. For example, the first member can receive endorsements from other members in fifty different skills, but only the three featured skills selected at operation 340 are published on the profile page of the first member.

In some instances, the endorsement suggestion is presented on a profile page of the social network. In other instances, the endorsement suggestion may be presented on a home page of the social network the For example, the social network system 210 can present the featured skill of the first member when the first member has commented on a posting. The posting can be published on the home page or the profile page of the second member, and the comment of the first member being viewable by the second member. In this example, the featured skill can be further selected based on a subject matter of the content of the posting. For example, the posting can be a news media article about finance, and the featured skill presented along with the comment of the first member can be that the first member is skilled in finance based on an attained degree, a job title, or an industry.

In some instances, the social network system 210 can access, from the skill reputation database 118, a reputation score for each skill in the plurality of skills associated with the first member. The quality scores calculated at operation 340 can be further based on the reputation score 228 of the first member in each skill. The server machine 110 can access the skill reputation database 118 using network 190. The skill reputation database 118 stores reputation data 225, such as a reputation score 228 of a member for a specific skill. Equation 4 describes an algorithm for determining the reputation score 228, according to some embodiments. As previously mentioned, the reputation score 228 is an indication of the skill level associated with the endorser 126 in the specific skill. A processor in the server machine 110 can calculate the reputation score 228 in real-time. In some instances, part of the calculation of the reputation score 228 can be performed offline using the offline data processor 240. In some instances, the reputation score associated with the first member having the specific skill can depend on the endorser having the specific skill listed on a profile page of the first member. For example, the reputation score 228 increases when the specific skill is listed on the profile page of the first member. Moreover, the reputation score 228 associated with the first member having the specific skill can be associated with the first member having a job title that is related to the specific skill. Furthermore, the reputation score associated with the first member having the specific skill can be associated with the first member having an educational degree that is related to the specific skill. In some instances, the reputation score of the first member for the specific skill is based on the first member having an educational degree that is related to the specific skill.

In some instances, the quality score depends on the endorser value. Equation 1 describes an algorithm for determining the endorser value, according to some embodiments. The endorser value calculator 206 can access the reputation data 225 of the first member from the skill reputation database 118. In some instances, the endorser value calculator 206 can access the reputation score 228 of the first member in the specific skill (e.g., accounting) in order to determine the endorser value. The endorser value can be directly correlated to the reputation score 228. In one example, the endorser value can be equal to the reputation score 228. For example, if the reputation score 228 of the first member in the specific skill (e.g., accounting) is a first number (e.g., 80), then the endorser value can also be the first number. In another example, the endorser value increases by a predetermined amount or ratio on a direct correlation basis with the reputation score 228. In some instances, the endorser value calculator 206 can access profile data 212 of the endorser 216. The profile data 212 can include years of experience, and the endorser value is in association with the years of experience of the endorser 216. For example, the endorser value can be directly proportional to the number of years of experience. The endorser value can increase by a predetermined ratio on a direct correlation basis with the number of years of experience. For example, the endorser value can be determined based on the number of endorsements received by the endorser 126, the number of endorsements given by the endorser 126, the number of skills listed on the profile of the endorser 126, a consumer marketing segment associated with the endorser 126, seniority of the endorser 126, first-degree connections of the endorser 126, years in career, number of endorsements per connection, and other member data 220 of the endorser 126.

The endorser value calculator 206 can access, from the endorsement database 120, endorsements that have the first member as either the receiver or the sender of an endorsement (e.g., as either the endorser 126 or the recipient 127). Additionally, the endorser value calculator 206 can update the endorser value based on a number of endorsements received by the first member and a number of endorsements sent by the first member. The endorser value can be updated based on the number of endorsements given or received by the first member. For example, the endorser value may increase when the first member has received more than a predetermined (e.g., 20) number of endorsements. Subsequently, the quality score calculator 204 can update the quality score 235 based on the updated endorser value.

In some instances, the quality score 235 can depend on the recipient value of the second member. For example, the social network system 210 can determine, from the member data 220, a number of endorsements received by the second member and a number of endorsements sent by the second member. Furthermore, the recipient value is determined based on the number of endorsements received by the second member and the number of endorsements sent by the second member. Equation 2 describes an algorithm for determining the recipient value, according to some embodiments. For example, the recipient value can be the number of endorsements given (i.e., the first member is the sender) and received (i.e., the second member is the receiver). In another example, the recipient value may be only the number of endorsements received or the number of endorsements given. Subsequently, the quality score calculator 204 can update the quality score 235 based on the recipient value. The recipient value can be determined based on the number of endorsements received by the recipient 127, the number of endorsements given by the recipient 127, the number of skills listed on the profile of the recipient 127, a consumer marketing segment associated with the recipient 127, seniority of the recipient 127, first-degree connections of the recipient 127, years in career, and other member data 220 of the recipient 127.

In some instances, method 300 further includes the social network system 210 determining an overlap value for the first member and second member based on the member data 220 of the first and second members. In some embodiments, such member data 220 includes profile data 212 of the first and second members. Additionally, the quality score 235 is updated based on the overlap value. The overlap value calculator 208 can determine an overlap value between the first member and the second member using the member data 220. For example, Equation 3 describes an algorithm for determining the overlap value. The member data 220 can be stored in member database 115. The member data 220 includes profile data 212 and social graph data 214. The profile data 212 includes employment information and the education information of the endorser 126 and the recipient 127. Additionally, the profile data 212 can include an endorsement of a member skill, a recommendation of the member, and the member's years of experience, location, job title, position in current company, projects completed with the company, current projects, published papers, patents, school, education information, portfolio, certifications, awards, and so on. The social graph data 214 includes a member's first-degree connections and second-degree connections.

A processor in the server machine 110 can calculate the overlap value in real-time. In some instances, part of the calculation of the overlap value can be performed offline using the offline data processor 240. In some instances, the overlap value is determined using the similarity between the employment information and the education information of the first member and the second member. For example, the overlap value increases when the first member and the second member studied at the same school or worked at the same company. Alternatively, the overlap value decreases when the first member and the second member studied at different schools or worked at different companies. Additionally, the overlap value can depend on similarities of other profile data 212 (e.g., location, job title, industry, certifications) of the first member and the second member. In some instances, method 300 further includes the social network system 210 calculating a connection density value between the first member and the second member, and updating the overlap value based on the connection density value. For example, the overlap value can be using a connection density value (e.g., connection strength) between the first member and the second member. The overlap value calculator 208 calculates a connection density value between the first member and the second member, and updates the overlap value using the connection density value. For example, when the first member has n=10 first-degree connections, there are 45 ($45=\Sigma_{k=1}^{n} k-1=9+8+7+6+5+4+3+2+1$) unique first-degree and second-degree connections. Additionally, the first member and the second member have 20 similar connections (e.g., same members) that are either a first-degree or a second-degree connection. Therefore, based on the 20 similar connections in the 45 unique first-degree and second-degree connections, the connection density value is 44%. In one example, the overlap value can equal the connection density value.

In some instances, the overlap value further depends on a first geographic region associated with the first member and a second geographic region associated with the second member. For example, the overlap value increases when the first region is the same as the second region, inferring that the first member and the second member live in the same region. Alternatively, the overlap value decreases when the first region is not the same as the second region.

Additionally, the overlap value can be further based on a first geographic region associated with the first member and a second geographic region associated with the second member. The overlap value can increase when the first region is the same as the second region.

Furthermore, the overlap value can be determined based on employment information, education information, location information, and a connection density value. The employment information includes company name, industry, job title, job function, and occupation. The education information includes school, degree, and field. The location information includes country, locale, and region.

Figure 4:
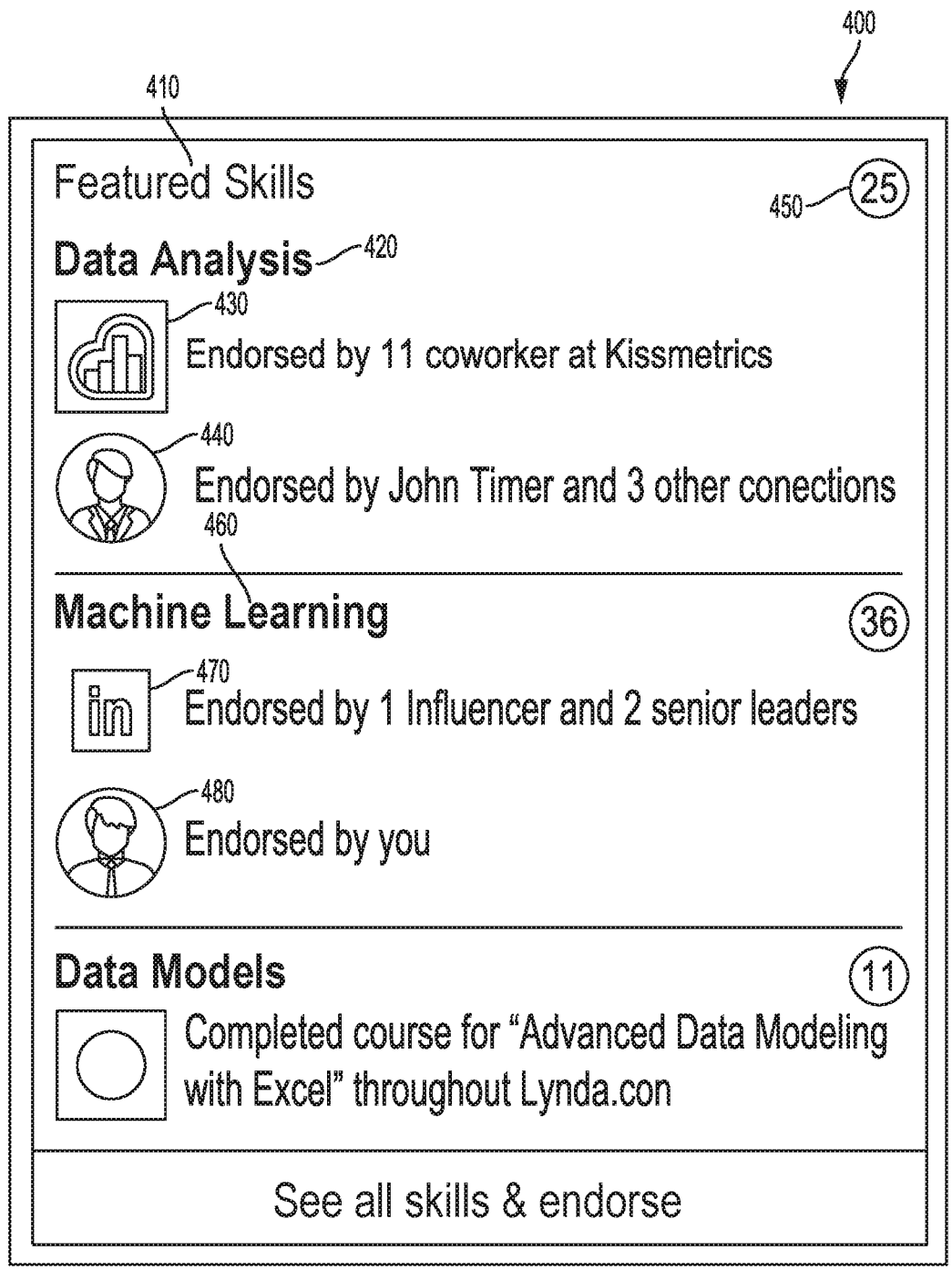
FIG. 4 is a user interface diagram illustrating an example of a featured skill on a profile page using the techniques described in FIG. 3, according to some example embodiments.

In some instances, the featured skill is listed on the profile page of the first member when the quality score is above the predetermined threshold. Additionally, in some examples, the featured skill further includes employment information (e.g., name of employer, job title) of the first member. Furthermore, the featured skill may further include educational information (e.g., degree, major, name of school) of the endorser. An example of a featured skill is illustrated in FIG. 4.

In some instances, the social network system 210 can include an endorsement database 120 storing endorsement data 230. The endorsement data 230 includes a plurality of endorsements, with each endorsement 125 in the plurality of endorsements being associated with a sender, a receiver, and a skill. The sender is the member sending the endorsement associated with a specific skill, and the receiver is the member receiving the endorsement. Additionally, each endorsement in the plurality of endorsements stored in the endorsement database 120 can include a classification.

The method 300 can further include the quality score calculator 204 classifying the endorsement as a high-quality endorsement when the quality score 235 is above the predetermined threshold. Alternatively, the quality score calculator 204 can classify the endorsement as a low-quality endorsement when the quality score 235 is below the predetermined threshold. Subsequently, the classification is presented on a profile page of the recipient by the user interface 202.

Additionally, the quality score calculator 204 can verify an expert in a skill from a plurality of members based on the calculated quality score for the skill. The calculated quality score for the skill of the expert can be higher than a second predetermined threshold (e.g., 95), with the second predetermined threshold being higher than the predetermined threshold. The predetermined thresholds can be set by an administrator of the social network system 210 or determined dynamically based on user input and past quality scores for the skill.

FIG. 4 is a user interface diagram illustrating an example of a featured skill on a profile page using the techniques described in FIG. 3, according to some embodiments.

A user interface 400 in FIG. 4 presents a featured skill section 410 on a profile page of a member. The featured skill section 410 includes a first featured skill 420 and a second featured skill 460. As previously mentioned, an endorsement for a skill can be presented with a validation when the quality score 235 of the endorsement is above a predetermined threshold. The validation of the endorsement can include the skill being listed as a featured skill (e.g., first featured skill 420) on the profile page of the member.

Additionally, the first featured skill 420 can include member data 220 (e.g., employment information, educational information, social graph data) of the endorser (e.g., endorser 126). For example, the first featured skill 420 includes employment information 430 of the endorsers. The employment information 430 can include the employer name, which can be presented by validating the skill as being endorsed by coworkers of the recipient (e.g., recipient 127). Moreover, the first featured skill 420 includes social graph data 440 of the viewer of the profile, such as including common connections of the viewer that have endorsed the member. The first featured skill 420 can also include the total number 450 of endorsements received for the skill.

In another example, the second featured skill 460 highlights leaders 470 (e.g., influencers, senior leaders, executives) that have endorsed the recipient. Furthermore, the second featured skill 460 can highlight relevant viewer information 480, such as when the viewer endorsed the recipient in the skill.

Figure 5:
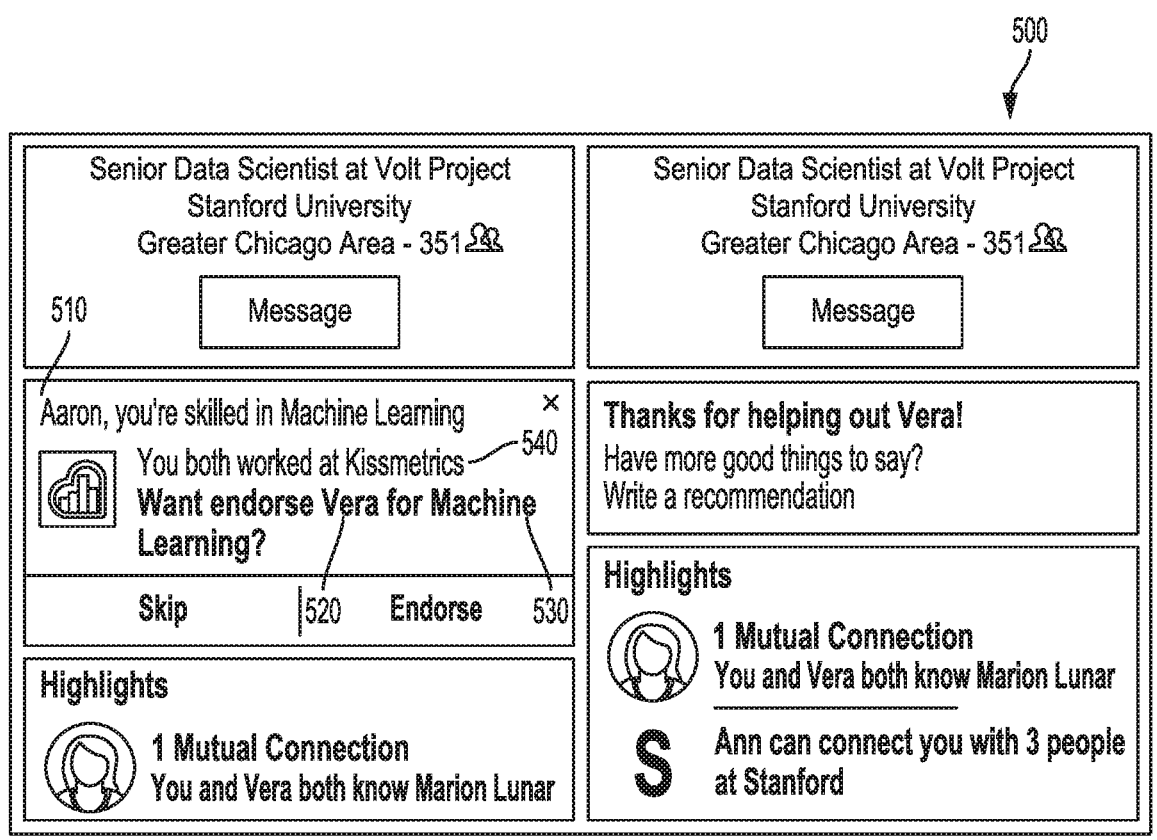
FIG. 5 is a user interface diagram illustrating an example of an endorsement suggestion, according to some example embodiments.

FIG. 5 is a user interface diagram illustrating an example endorsement suggestion using the techniques described in FIG. 3, according to some embodiments. A user interface 500 in FIG. 5 presents an endorsement suggestion to a first member 510 for endorsing a second member 520 in a skill 530. In this example, the first member 510 is Aaron, the second member 520 is Vera, and the skill 530 is machine learning. Additionally, the endorsement suggestion includes a common employer 540, Kissmetrics, that employed both the first and second members.

According to various example embodiments, one or more of the methodologies described herein facilitate an endorsement suggestion of a skill for a member using the member data 220. Additionally, using the database structure illustrated in FIG. 2, the data processing associated with the suggesting of the endorsement is in real-time by using the offline data processor 240 for some calculations. For example, the social network system 210 can use the offline data processor 240 in such a way as to allow efficient retrieval and processing of the information in order to present the validation in real-time.

When these effects are considered in aggregate, one or more of the methodologies described herein may obviate a need for certain human efforts or resources that otherwise would be involved in calculating the quality score and validating the endorsement. Furthermore, computing resources used by one or more machines, databases, or devices (e.g., within the network environment 100) may similarly be reduced (e.g., by pre-determining the endorser value and the recipient value). Examples of such computing resources include processor cycles, network traffic, memory usage, data storage capacity, power consumption, and cooling capacity.

The validation process allows job seekers, recruiters, and market analysts to quickly find accurate information (e.g., subject matter experts) in the social network system 210. The user interface 202 provides structure to search results, which enables fast navigation and discovery.

In order for a user to have a great search experience, correctness and performance are key. Conventional approaches either sacrifice correctness or do not perform fast enough. The methodologies described herein facilitate accurate skill determination by removing false positives using a validation process using data available in the social network system 210. Additionally, by using the offline data processor 240 to perform some of the calculations when dealing with very large data sets, such as the member data 220, the results can be presented faster than they would be using current conventional approaches.

Example Endorsement Infrastructure

In some instances, the endorsement database 120 in FIG. 1 can include endorsements (e.g., endorsement 125) that are generated from a suggested endorsement pipeline or from an organic endorsement pipeline. In the suggested endorsement pipeline, the social network system 210 can suggest, to an endorser, an endorsement of a specific skill for a recipient. In the organic endorsement pipeline, the social network system 210 can serve an endorsement to a recipient when an endorser endorses the recipient for a specific skill.

For example, the suggested endorsement pipeline can be part of a backend infrastructure that produces a set of endorsement suggestions that are presented to a member to help guide the member's endorsements for skills processes by other first-degree connections. The suggested endorsements offer a convenient way for the endorser to emphasize skills possessed by the endorser's connections (e.g., a first-degree connection). Once a suggested endorsement is selected by the endorser, the endorsement is published on the profile page of the recipient, and the endorsement is stored in the endorsement database.

Additionally, the organic endorsement pipeline includes an endorsement stack (e.g., a set of predefined skills) that an endorser can select when viewing the profile page of the recipient. For example, the organic endorsement pipeline allows a first member to endorse a first-degree connection when the first member is viewing the profile of the first-degree connection. Subsequently, the social network system 210 can serve the endorsement by publishing the endorsement on the profile page of the first-degree connection. Furthermore, the endorsement is stored in the endorsement database.

Serving Endorsements

In the suggested endorsement pipeline, the social network system 210 can utilize a micro-service infrastructure. The micro-service infrastructure allows the endorsement feature to be encapsulated in a single service, which allows all of the data processing operations to be performed on the endorsement within the micro-service infrastructure. The micro-service infrastructure allows the endorsement feature to evolve at its own pace as long as it remains backward-compatible.

The database architecture can be a single Structured Query Language (SQL) instance where all of the endorsements are served from the single SQL instance. For large-scale implementations (e.g., 10 billion or more endorsements at thousands of queries per second (QPS)), the database architecture is designed to allow optimization of the indices that are used in the database. For example, when a first member (e.g., endorser) endorses a second member (e.g., recipient) with a skill endorsement, the database architecture of the social network system 210 can be a structured index with the following hierarchy:

Recipient Id (1)→Endorsed Item (2)→Endorser Id (3)

In this example, using indices associated with a recipient identifier, an endorsed skill, and an endorser identifier, the online social network service can quickly and efficiently perform operations in a large scale implementation. Example operations can include:

Retrieve all endorsements where member "Joey" was the recipient: Some embodiments use index (1), then retrieve all matching rows.

Retrieve all endorsements wheremember "Joey" was the recipient for skill "Java": Some embodiments use a combination of index (1) and (2) and some embodiments list all rows.

Retrieve all endorsements wheremember "Joey" was the recipient for skill "Java": given by "Yolanda" (assuming "Yolanda" is the endorser): This time some embodiments use a combination of indices (1), (2), and (3) and retrieve the rows that are found.

For example, if we wanted to find all the endorsements given by member "Joey," a search may include a full traversal of the 10 billion rows in the database.

Suggested Endorsements

Concerning suggested endorsements, there may be two pipelines. In the first pipeline, the endorsable skills, this flow predicts a list of skills that a member might have or might want to promote. In the second pipeline, the suggested endorsements, this flow provides a list of (recipient, skill) tuples each member can endorse. In some instances, the two pipelines generate suggestions offline in Hadoop workflows that use machine learning, incorporating features such as mutual connections, profile information, and previous endorsements.

Figure 6:
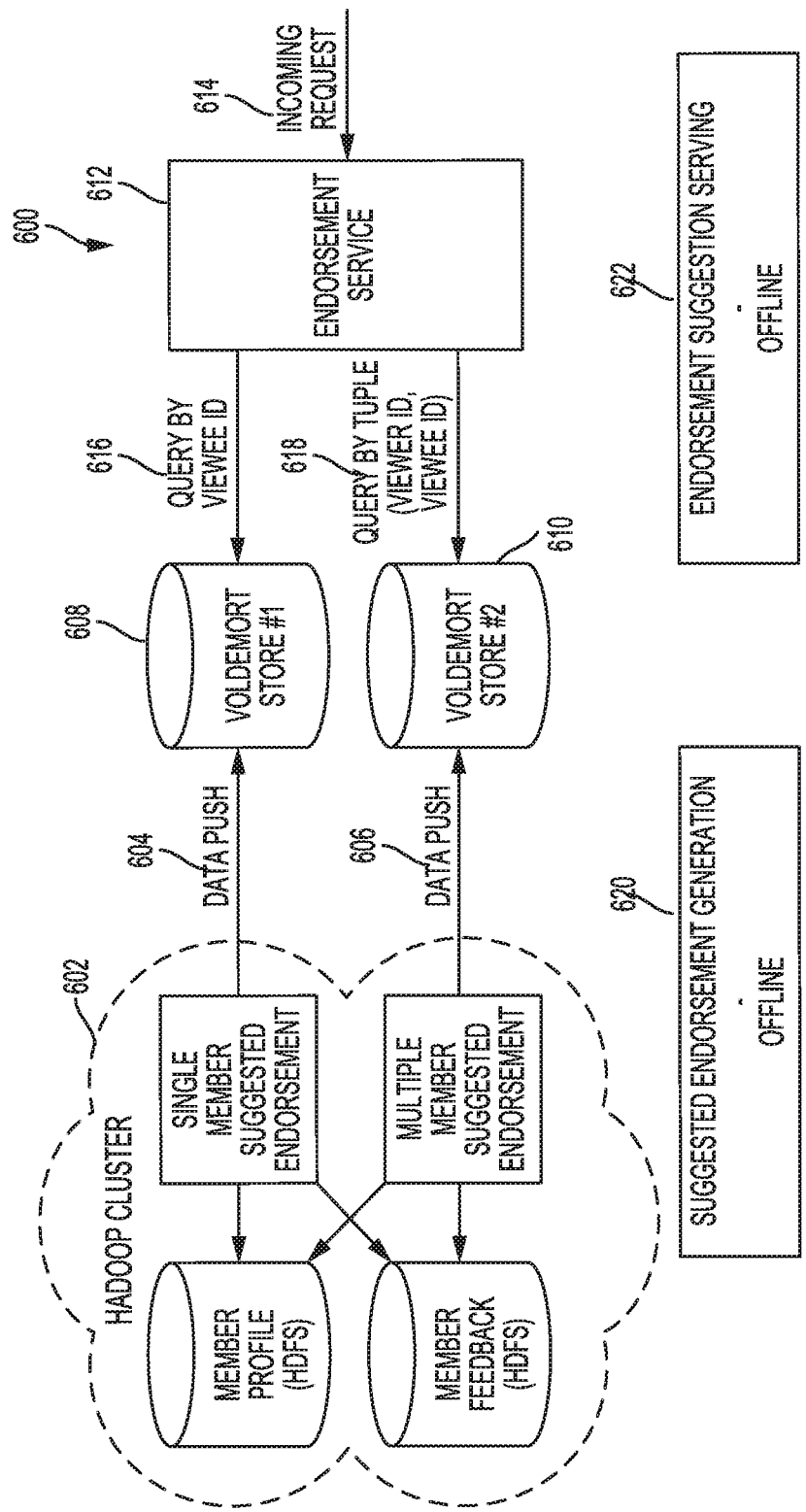
FIG. 6 is a diagram illustrating an example of endorsement database architecture, according to some example embodiments.

FIG. 6 is a diagram illustrating an example of an endorsement infrastructure 600 including an endorsement database architecture. The "endorsable skills" and "suggested endorsements" data are pushed to two different distributed key-value storage system (e.g., Voldemort™ data stores 608 and 610 as shown in FIG. 6). In some embodiments, key-value stores are queried online by an endorsement service 612 to fetch potential endorsements, which are then delivered to the user, as illustrated in the example endorsement infrastructure 600 in FIG. 6. As shown in FIG. 6, the endorsement infrastructure 600 may include a Hadoop cluster 602 that performs data pushes 604, 606 to data stores 608, 610. As illustrated in FIG. 6, the endorsement infrastructure 600 can also include an endorsement service 612 that receives an incoming request 614 and in response, submits queries 616, 618 to the data stores 608, 610. As shown, the endorsement infrastructure 600 may also perform offline suggested endorsement generation 620 and offline endorsement suggestion serving 622.

In a distributed database, the data can be automatically replicated over multiple servers. Additionally, the data can be automatically partitioned so each server contains only a subset of the total data. Moreover, the distributed database can provide tunable consistency (e.g., strict quorum or eventual consistency). Furthermore, server failure is handled transparently. The distributed database has pluggable storage engines and pluggable serialization. Data items are versioned to maximize data integrity in failure scenarios without compromising availability of the system. Each node is independent of other nodes with no central point of failure or coordination.

Additionally, machine learning algorithms powering the suggestions can be fine-tuned to optimize for virality and skill diversity. In some instances, the suggestions may be determined using models such as a linear regression model, a decision tree model, a support vector machine model, and a Naïve Bayesian model, or other machine learning algorithms.

Optimizing for the Right Target Metric

One goal of techniques for presenting endorsements is to present endorsements based on a metric referred to as a "Highly-Rated Endorsement."

Example techniques get feedback from the members. For example, in order to retrain the algorithms to deliver a better experience, user inputs are received to analyze which endorsements the members value.

Figure 7:
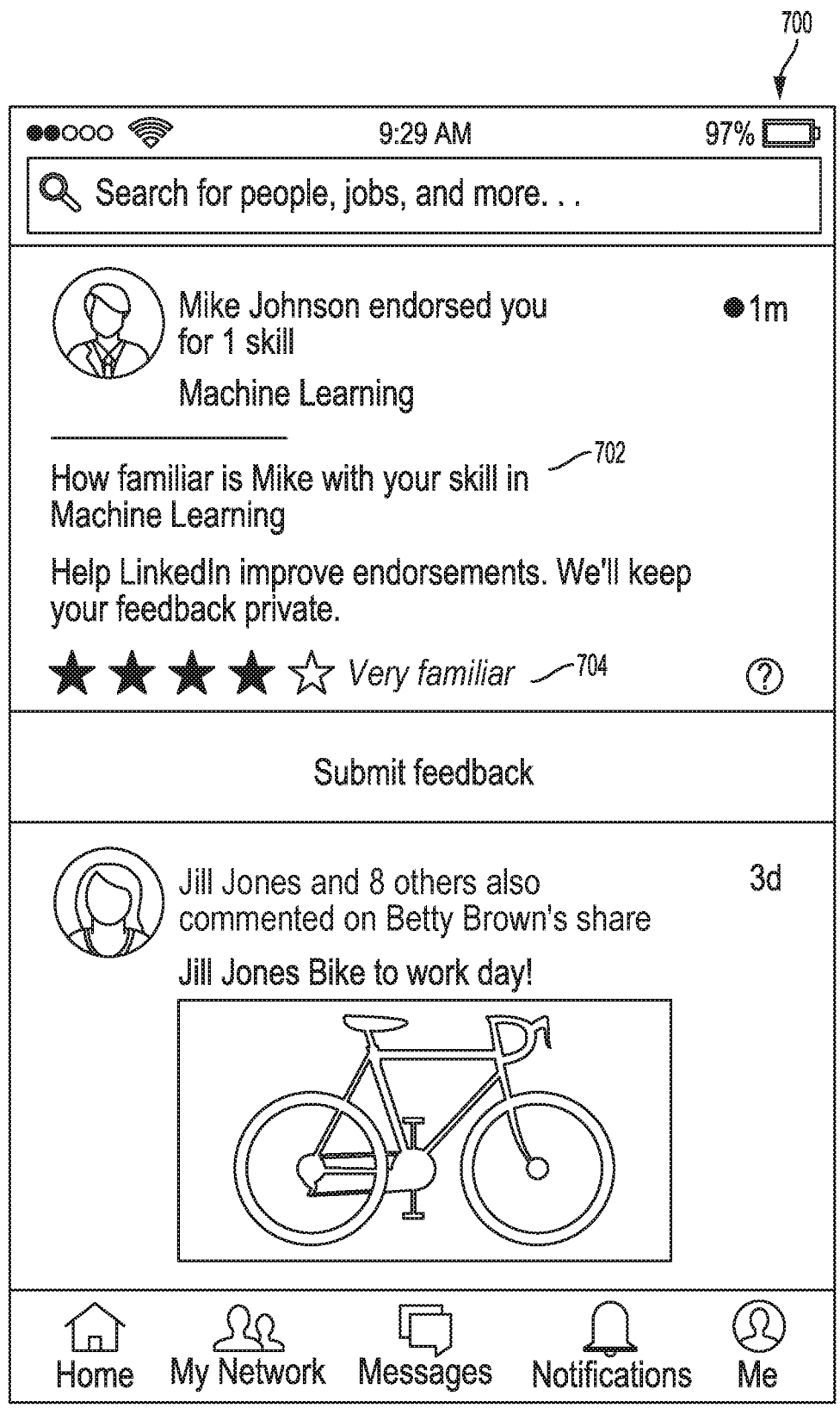
FIG. 7 is a user interface diagram for a review of a received endorsement, according to some example embodiments.

The online social network system 210 can include the capability for members to provide in-network (i.e., within the online social network system 210) feedback through notifications they received about new endorsements. FIG. 7 is a diagram of a user interface 700 for a review of a received endorsement. In particular, FIG. 7 shows how feedback 704 to questions 702 such as "How familiar is this connection with your skill?" or "How valuable is this endorsement?" may be solicited and collected via the user interface 700. The online social network system 210 can use the feedback 704 to develop a target metric as illustrated in FIG. 7.

The target metric for Endorsements can capture endorsements that offer meaningful validation of a member's skill. From member feedback that is gathered (e.g., via a user interface such as the user interface 700 of FIG. 7), it may be observed that validation comes from endorsers who know both the recipient and the skill.

Figure 8:
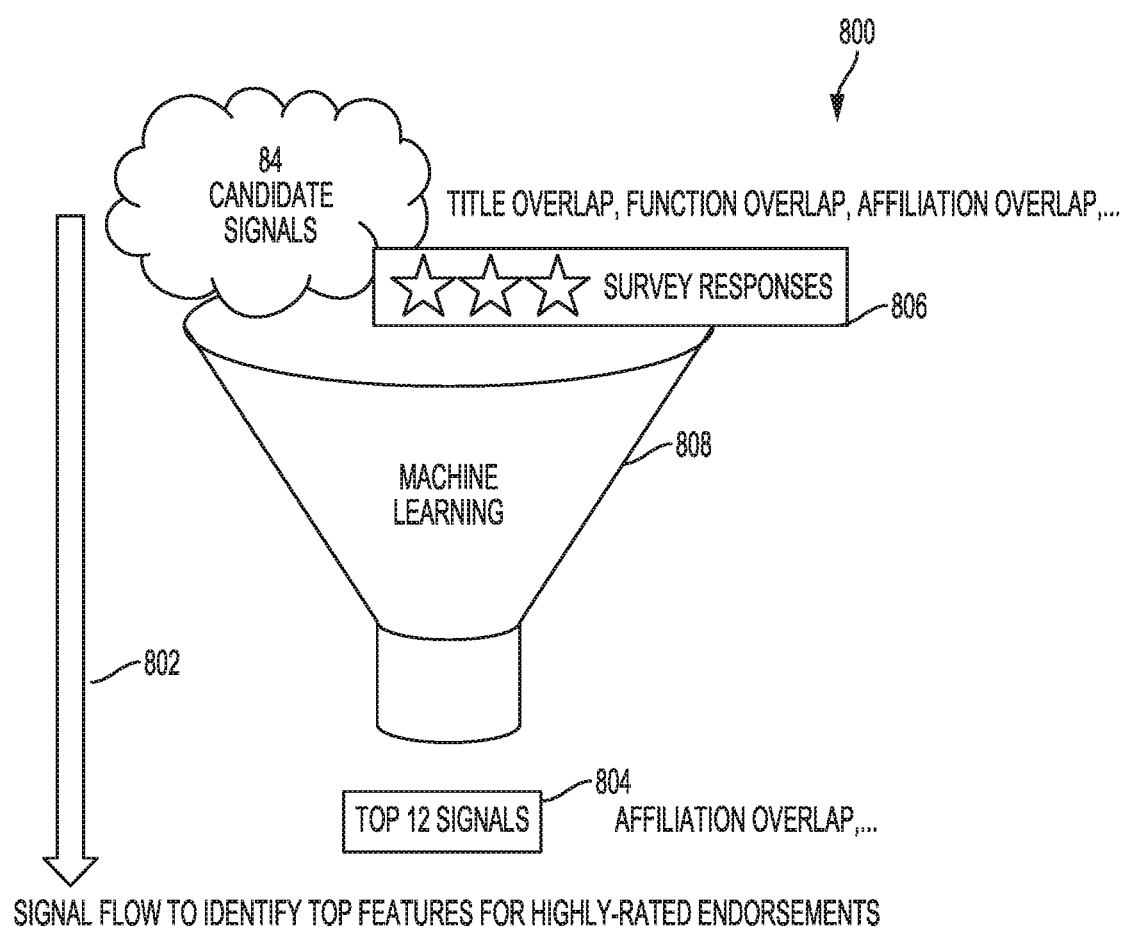
FIG. 8 is a diagram illustrating an example of determining top signals for a featured skill, according to some example embodiments.

FIG. 8 is a diagram 800 illustrating an example of determining top signals for a featured skill. To build a more specific target metric, the online social network system 210 uses the different candidate signals (e.g., over 80 candidate signals as shown in FIG. 8) about the endorser, recipient, and their relationship that could be useful for the target metric's definition. Example of signals include, but are not limited to, seniority, skill, reputation score, marketing segment, company, title, new skill, existing skill, years in career, endorsements received, endorsements given. An endorsement may be received or given for either a new skill or an existing skill.

These features, combined with the responses, allow the online social network system 210 to correlate different features with the positive signals received through in-network feedback. Using various machine learning algorithms, the online social network system 210 can identify the most useful signals (e.g., fewer than 12) as illustrated by diagram 800 in FIG. 8. As illustrated in the diagram 800, the signal flow 802 can be used to identify top features 804 for highly-rated endorsements that are to be presented. As shown in FIG. 8, the signal flow 802 may include inputting a number of candidate signals (e.g., 84 candidate signals in the example of FIG. 8) and survey responses 806 into a machine learning model 808 to produce machine learning results (e.g., the top features 804). As illustrated in FIG. 8, the candidate signals may also include overlap between members' titles, functions, affiliations, and other member profile attributes.

Using the machine-learned model 808, from the 12 top features, the online social network system 210 can build candidate definitions for a highly-rated endorsement. For example, an endorsement can be a highly-rated endorsement when given by a coworker who is an expert in the skill area. For each candidate definition, the online social network system 210 can obtain the recall rate and precision alongside human understandability in order to determine the relevant (e.g., top) signals.

At the end of the process, the online social network system 210 can developed a target Endorsement metric. For example, the metric labels a highly-rated endorsement when it is one made by a connection that knows the person and the skill.

Additionally, for each component of the definition (knowing the skill and knowing the person), the online social network system 210 can identify thresholds for the respective top signals (for each component) based on intuitive cut-offs backed by machine learning results.

Backend Infrastructure for Serving Endorsements

As previously described, the endorsements feature has two main components: one for suggested endorsements, and another for serving endorsements. The suggested endorsement pipeline is a part of a backend infrastructure that produces a set of suggestions that are presented to the members to help guide their endorsements for people in their network. The machine learning techniques described herein can improve the relevance of the suggestions given to the members. By integrating the endorser's reputation score for skills, the online social network system 210 can suggest endorsements from members with good skill reputations.

Becoming an Edge in the Graph

In some instances, the endorsement database 120 is a graph database that allows real-time queries on the platform, such as the different degrees of each member's connections. The graph database excels when relating entities (Nodes) to each other along relationships (Edges). On top of new functionalities, the graph database is heavily optimized and is able to support millions of queries per second at very low latencies.

Additionally, the graph database can re-bootstrap itself (rebuild from scratch) every week. In order to do that, Hadoop jobs can run on offline data and push the entire dataset to the graph.

Figure 9:
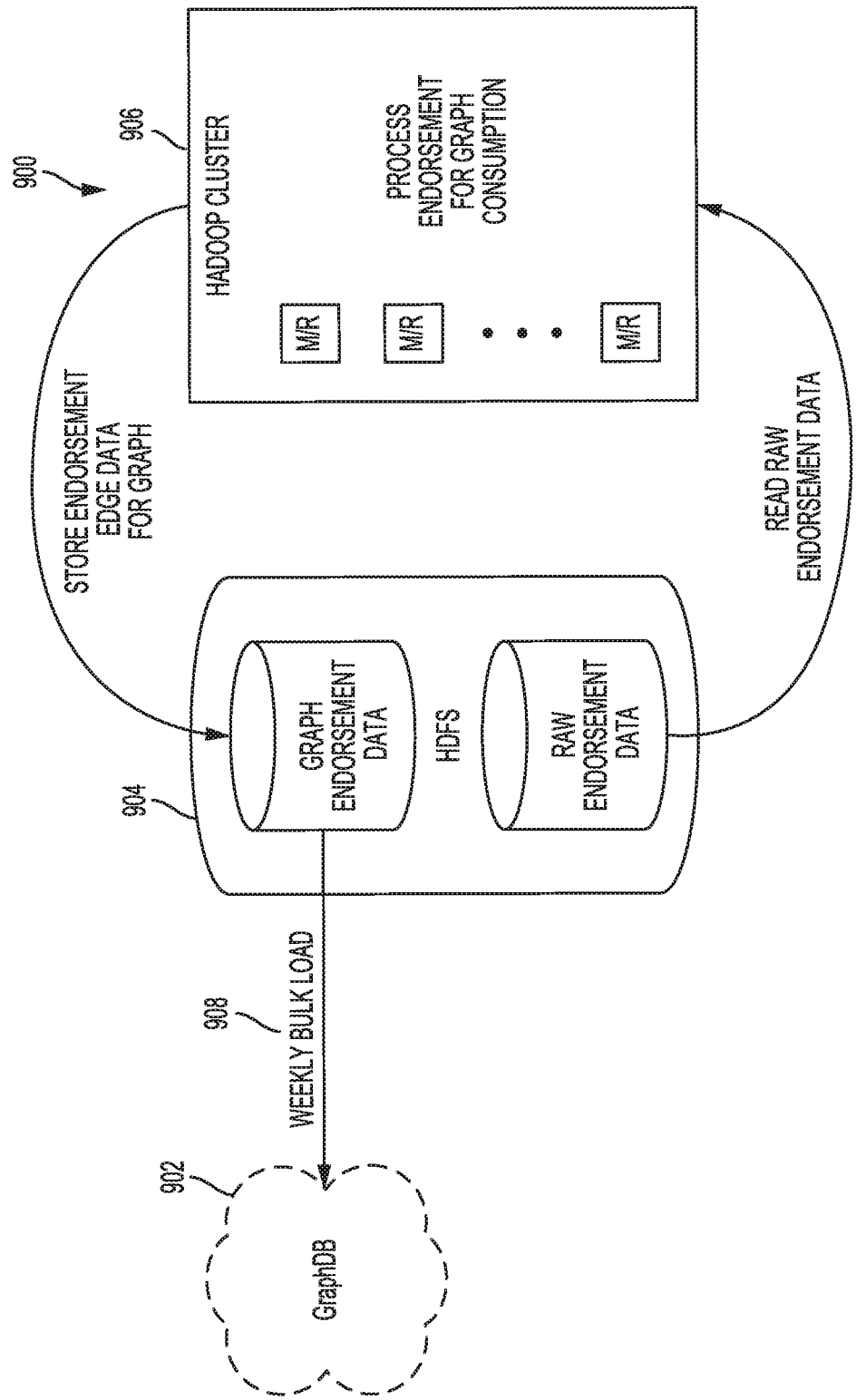
FIG. 9 is a diagram illustrating an example of endorsement database architecture, according to some example embodiments.

FIG. 9 is a diagram illustrating an example of an endorsement database architecture 900. As illustrated in the diagram in FIG. 9, a graph database 902 can write Hadoop jobs that fetch raw endorsements data from a Java-based file system 904 that provides scalable and reliable data storage. The endorsement database architecture 900 is designed to span large clusters of commodity servers, such as a Hadoop Distributed File System (HDFS) or the Hadoop cluster 906 shown in FIG. 9. Subsequently, the graph database 902 can massage fetched data (e.g., data fetched via a bulk load 908), and apply the proper filtering to generate endorsement edge data. Another job in the graph stack can include picking up that data and loading it into graph DB clusters.

Handling Online Events

In some instances, the number of writes (e.g., new endorsements/endorsement status updates) to the endorsement database 120 can be high, reaching more than one hundred updates per second. Therefore, a bulk load approach that runs every week or even every day could mean falling behind over time. More importantly, when a member edits an endorsement, the profile page of the member should reflect that change in real-time.

In a legacy database, when an update occurs (for example when a member updates, deletes, or accepts an endorsement), the system can query a services stack, transform the query into an SQL command, and update the rows in the database.

According to some embodiments, with the graph database infrastructure, an SQL database can store the endorsement data to present the endorsement in real-time on a profile page, and the graph database can be the serving mechanism. Accordingly, the updates in the endorsement service can be written directly in the SQL database, and may later be pushed to the graph database. In some instances, it may not be efficient for the endorsement service to write directly to the graph database. For example, in order to keep control over the rate of updates coming to the cloud and the complex nature of some updates (for example, a member connection triggers many smaller updates to many nodes and edges), the online social network system 210 can use a messaging queue to push updates to the graph database.

Figure 10:
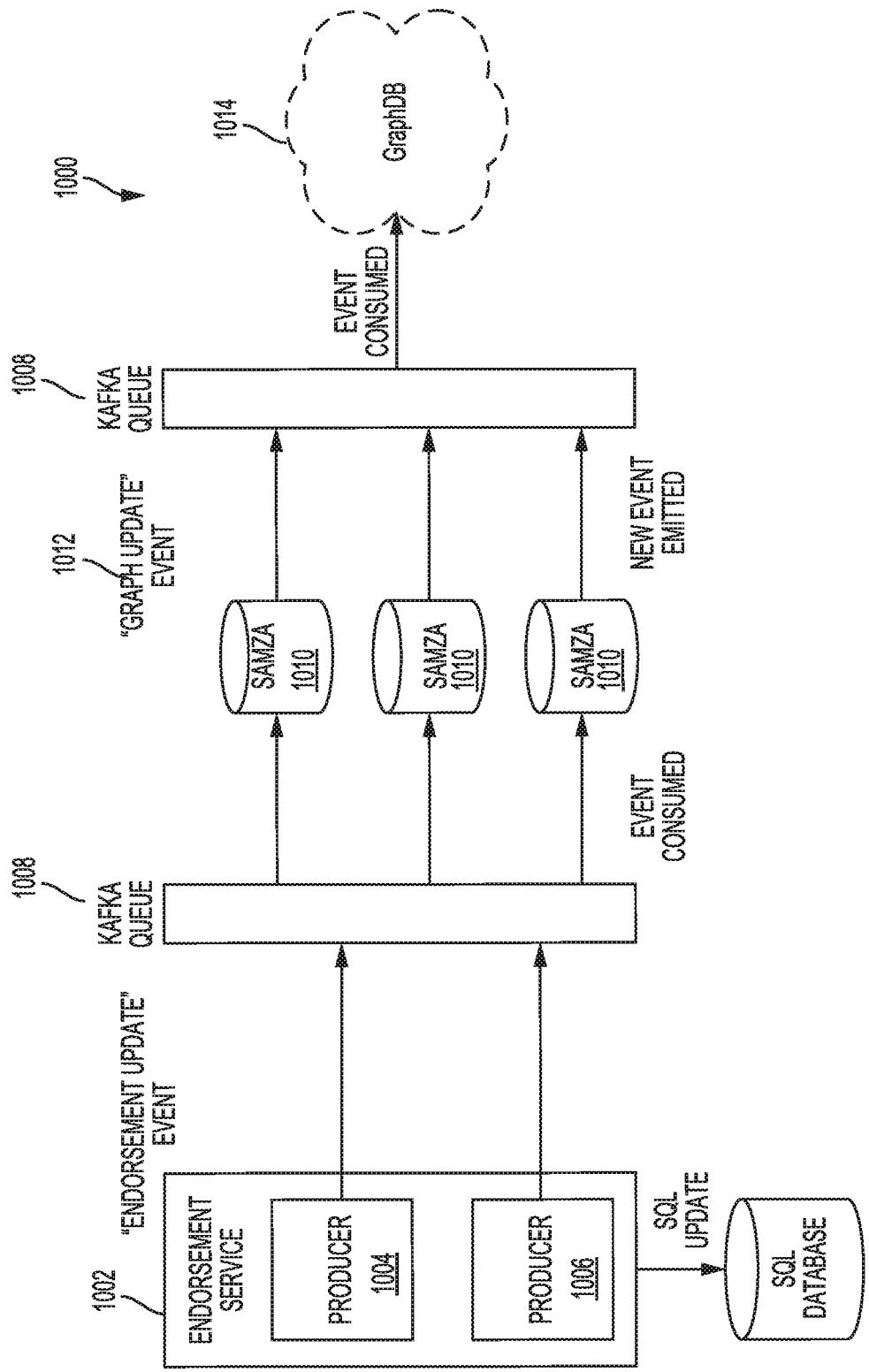
FIG. 10 is a diagram illustrating an example of endorsement database architecture, according to some example embodiments.

FIG. 10 is a diagram illustrating an example of an endorsement database architecture 1000. As illustrated in FIG. 10, the endorsement database architecture 1000 may include producer nodes 1004, 1006 (nodes of endorsement service 1002) that can emit an event and push it to a Kafka cluster 1008 on a specific topic, according to some embodiments. For example, the consumers of this event may be Samza instances 1010 that take the event 1012 and transform the initial event with additional data that may be too expensive for the producer to acquire. Continuing with the example, Samza instances 1010 can then call the graph database 1014 through dedicated APIs to update the graph data stored in the graph database 1014.

Using the graph database 1014 infrastructure described herein, the endorsements dataset stored in the graph database 1014 can provide more highly-rated endorsements and improved endorsement insights to members of the online social network system 210. The graph database infrastructure allows the online social network system 210 to serve targeted and highly-rated endorsements to the members of the online social network system 210.

Example Machine Architecture and Machine-Readable Medium

Figure 11:
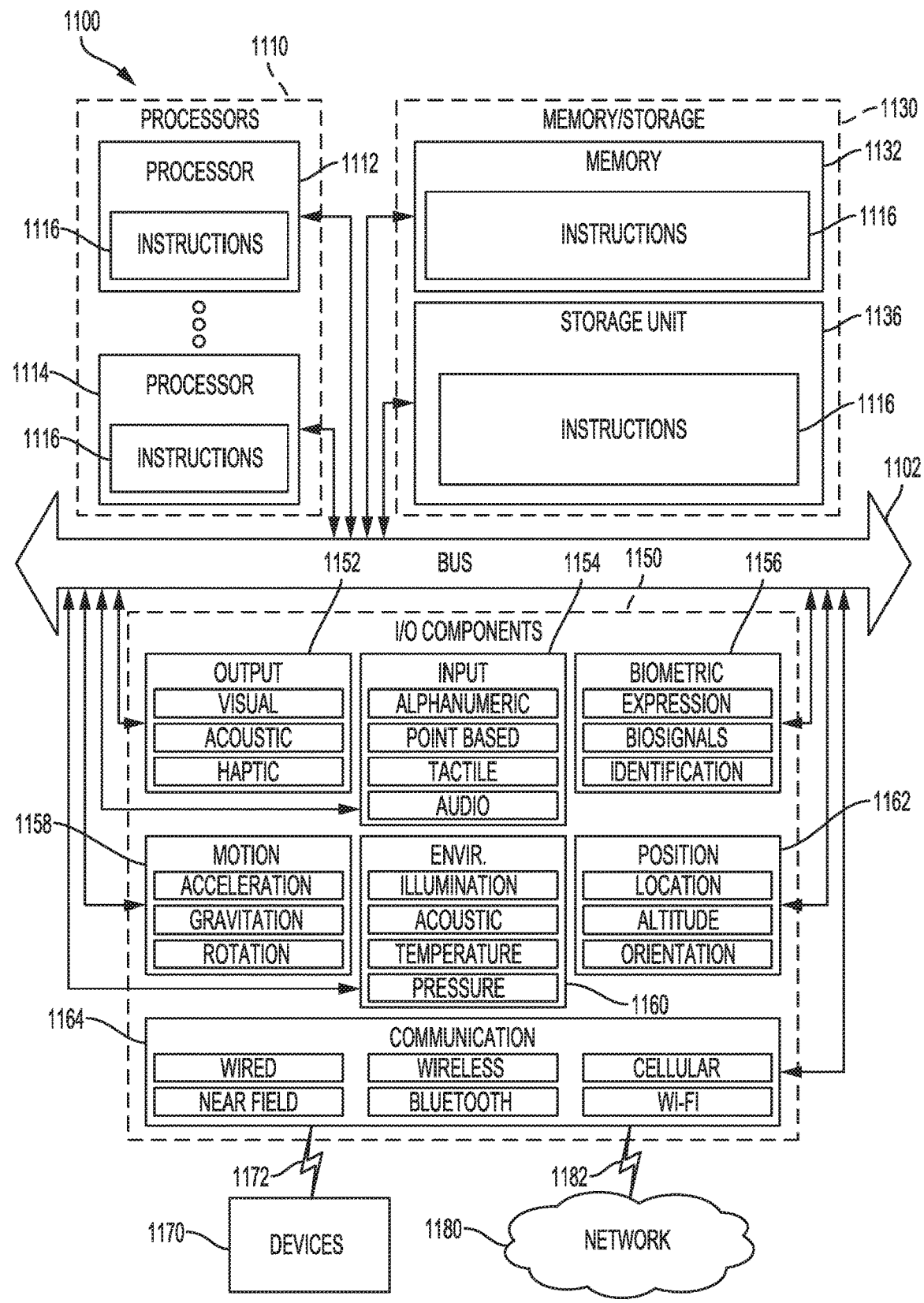
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute the flow diagrams of FIGS. 3, 9, and 10. Additionally, or alternatively, the instructions 1116 may implement the processes performed by quality score calculator 204, endorser value calculator 206, recipient value calculator 207, overlap value calculator 208 of FIG. 2, and so forth. The instructions 1116 transform the general, non-programmed machine into a particular machine programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory/storage 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that may execute the instructions 1116. The term "processor" is intended to include multi-core processor that may comprise two or more independent processors (sometimes referred to as "cores") that may execute instructions contemporaneously. Although FIG. 11 shows multiple processors 1110, the machine 1100 may include a single processor with a single core, a single processor with multiple cores (e.g., a multi-core processor), multiple processors with a single core, multiple processors with multiples cores, or any combination thereof. For example, the operations described in method 300 can be performed by one or more of the processors 1110.

The memory/storage 1130 may include a memory 1132, such as a main memory, or other memory storage, and a storage unit 1136, both accessible to the processors 1110 such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of processors 1110 are examples of machine-readable media. The memory/storage 1130 can store the member data 220, the reputation data 225, or the endorsement data 230.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or other suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

Example Transmission Medium

In various example embodiments, one or more portions of the network 1180 may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a POTS network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer system comprising:
a processor;
a storage device;
a memory device holding an instruction set executable by the processor to cause the computer system to perform operations comprising:
training a machine learned model using a machine learning algorithm, wherein the training includes calculating a plurality of coefficients using an optimization function;
responsive to receiving, via a computing device of a first member of a social networking service, a request to view a member profile of a second member of the social networking service:
accessing member profile data of the second member to identify a set of skills, each skill in the set of skills a skill for which the second member has received an endorsement from one or more endorsers;
deriving an endorsement quality score for each endorsement of a skill in the set of skills by the one or more endorsers, the endorsement quality score for each endorsement derived as a combination of sub-scores including an endorser value based on characteristics of the endorser and a recipient value based on characteristics of the second member, the combination calculated by passing one or more features of the endorser and one or more features of the second member to the trained machine learned model and applying the calculated coefficients to the subscores;
selecting from the set of skills a particular skill, shared in common between the first member profile and the second member profile, according to member profiles of the first member and the second member, and associated with an endorsement having an endorsement quality score that exceeds a predetermined threshold;
presenting in a user interface, via the computing device of the first member of the social networking service, the member profile of the second member and member information identifying the particular skill and the endorser associated with the endorsement of the particular skill; and
retraining the machine learning model based on input received from the first member in response to the presenting.

2. The computer system of claim 1, further comprising:
for each endorsement of a skill in the set of skills by the one or more endorsers, deriving an endorsement value for the endorser associated with the endorsement of the skill as a weighted combination of characteristics of the endorser including the number of other endorsements of the skill made by the endorser for other members of the social networking service, and the number of endorsements of the skill received by the endorser from other members of the social networking service.

3. The computer system of claim 1, further comprising:
for each endorsement of a skill in the set of skills by the one or more endorsers, deriving an endorsement value for the endorser associated with the endorsement as a weighted combination of characteristics of the endorser, the characteristics of the endorser selected from the set of characteristics consisting of: number of endorsements made by the endorser; the number of endorsements received by the endorser; the number of skills possessed by the endorser, according to a member profile of the endorser; the number of years the endorser has been employed, according to a member profile of the endorser; the number of direct connections the endorser has with other members of the social networking service; and, the number of endorsements per direct connection for those direct connections the endorser has with other members of the social networking service.

4. The computer system of claim 1, further comprising:
for each skill in the set of skills, deriving for the second member a recipient value as a weighted combination of characteristics of the second member, the characteristics of the second member including the number of endorsements given by the second member to other members of the social networking service for the skill, and the number of endorsements received by the second member from other members of the social networking service for the skill.

5. The computer system of claim 4, wherein the endorser value, the recipient value and the overlap value are computed and stored in a database prior to receiving the request to view the member profile of the second member; and, subsequent to receiving the request to view the member profile of the second member, the endorser value, the recipient value and the overlap value are obtained from the database.

6. The computer system of claim 1, further comprising:

for each skill in the set of skills, deriving for the second member a recipient value as a weighted combination of characteristics of the second member, the characteristics of the second member selected from the set of characteristics consisting of: the number of endorsements of other members of the social networking service given by the second member; the number of endorsements received by the second member from other members of the social networking service; the number of skills possessed by the second member, according to a member profile of the second member; the number of years the second member has been employed, according to a member profile of the second member; the number of direct connections the endorser has with other members of the social networking service; and, the number of endorsements per direct connection for those direct connections the endorser has with other members of the social networking service.

7. The computer system of claim 1, further comprising:

for each endorser associated with an endorsement, deriving an overlap value based on characteristics shared in common between the endorser and the second member, the characteristics shared in common selected from the set of characteristics consisting of: employment with a common employer; employment with an employer or employers in a common industry; attendance at or matriculation from a common educational institution; academic degrees with a common major or common discipline of study; and, geographical location of residence;

wherein the endorsement quality score for each endorsement is derived as a combination of sub-scores including the endorser value, the recipient value, and the overlap value.

8. The computer system of claim 1, further comprising:

presenting in the user interface, via the computing device of the first member of the social networking service, the member profile of the second member and member information identifying a plurality of skills for which the second member has been endorsed by other members of the social networking service, wherein the particular skill is designated as a featured skill in the plurality of skills as a result of an endorser associated with the endorsement for the particular skill having the endorsement quality score that exceeds the predetermined threshold.

9. The computer system of claim 1, further comprising:

presenting in the user interface, via the computing device of the first member of the social networking service, the member profile of the second member and including with the member profile of the second member information identifying the particular skill, the endorser associated with the endorsement having the endorsement quality score that exceeds the predetermined threshold, and the number of endorsers who have endorsed the second member for the particular skill.

10. The computer system of claim 1, further comprising:

presenting in the user interface, via the computing device of the first member of the social networking service, a prompt requesting the first member to endorse the second member as possessing the particular skill.

11. A computer-implemented method comprising:

responsive to receiving, via a computing device of a first member of a social networking service, a request to view a member profile of a second member of the social networking service:

training a machine learned model using a machine learning algorithm, wherein the training includes calculating a plurality of coefficients using an optimization function;

accessing member profile data of the second member to identify a set of skills, each skill in the set of skills a skill for which the second member has received an endorsement from one or more endorsers;

deriving an endorsement quality score for each endorsement of a skill in the set of skills by the one or more endorsers, the endorsement quality score for each endorsement derived as a combination of sub-scores including an endorser value based on characteristics of the endorser and a recipient value based on characteristics of the second member, the combination calculated by passing one or more features of the endorser and one or more features of the second member to the trained machine learned model and applying the calculated coefficients to the subscores;

selecting from the set of skills a particular skill, shared in common between the first member profile and the second member profile, according to member profiles of the first member and the second member, and associated with an endorsement having an endorsement quality score that exceeds a predetermined threshold;

presenting in a user interface, via the computing device of the first member of the social networking service, the member profile of the second member and information identifying i) the particular skill, and ii) the endorser associated with the endorsement of the particular skill; and retraining the machine learning model based on input received from the first member in response to the presenting.

12. The computer-implemented method of claim 11, further comprising:

for each endorsement of a skill in the set of skills by the one or more endorsers, deriving an endorsement value for the endorser associated with the endorsement of the skill as a weighted combination of characteristics of the endorser including the number of other endorsements of the skill made by the endorser for other members of the social networking service, and the number of endorsements of the skill received by the endorser from other members of the social networking service.

13. The computer-implemented method of claim 11, further comprising:

for each endorsement of a skill in the set of skills by the one or more endorsers, deriving an endorsement value for the endorser associated with the endorsement as a weighted combination of characteristics of the endorser, the characteristics of the endorser selected from the set of characteristics consisting of: number of endorsements made by the endorser; the number of endorsements received by the endorser; the number of skills possessed by the endorser, according to a member profile of the endorser; the number of years the endorser has been employed, according to a member profile of the endorser; the number of direct connections the endorser has with other members of the social networking service; and, the number of endorsements per direct connection for those direct connections the endorser has with other members of the social networking service.

14. The computer-implemented method of claim 11, further comprising:

for each skill in the set of skills, deriving for the second member a recipient value as a weighted combination of characteristics of the second member, the characteristics of the second member including the number of endorsements given by the second member to other members of the social networking service for the skill, and the number of endorsements received by the second member from other members of the social networking service for the skill.

15. The computer-implemented method of claim 11, further comprising:

for each skill in the set of skills, deriving for the second member a recipient value as a weighted combination of characteristics of the second member, the characteristics of the second member selected from the set of characteristics consisting of: the number of endorsements of other members of the social networking service given by the second member; the number of endorsements received by the second member from other members of the social networking service; the number of skills possessed by the second member, according to a member profile of the second member; the number of years the second member has been employed, according to a member profile of the second member; the number of direct connections the endorser has with other members of the social networking service; and, the number of endorsements per direct connection for those direct connections the endorser has with other members of the social networking service.

16. The computer-implemented method of claim 11, further comprising:

for each endorser associated with an endorsement, deriving an overlap value based on characteristics shared in common between the endorser and the second member, the characteristics shared in common selected from the set of characteristics consisting of: employment with a common employer; employment with an employer or employers in a common industry; attendance at or matriculation from a common educational institution; academic degrees with a common major or common discipline of study; and, geographical location of residence;

wherein the endorsement quality score for each endorsement is derived as a combination of sub-scores including the endorser value, the recipient value, and the overlap value.

17. The computer-implemented method of claim 16, wherein the endorser value, the recipient value and the overlap value are computed and stored in a database prior to receiving the request to view the member profile of the second member; and, subsequent to receiving the request to view the member profile of the second member, the endorser value, the recipient value and the overlap value are obtained from the database.

18. The computer-implemented method of claim 11, further comprising:

presenting in the user interface, via the computing device of the first member of the social networking service, the member profile of the second member and information identifying a plurality of skills for which the second member has been endorsed by other members of the social networking service, wherein the particular skill is designated as a featured skill in the plurality of skills as a result of an endorser associated with the endorsement for the particular skill having the endorsement quality score that exceeds the predetermined threshold.

19. The computer-implemented method of claim 11, further comprising:

presenting in the user interface, via the computing device of the first member of the social networking service, the member profile of the second member and information identifying the particular skill, the endorser associated with the endorsement having the endorsement quality score that exceeds the predetermined threshold, and the number of endorsers who have endorsed the second member for the particular skill.

20. The computer-implemented method of claim 11, further comprising:

multiplying the endorser value by a first of the plurality of coefficients and the recipient value by a second of the plurality of coefficients.

* * * * *